(12) United States Patent
Kotaru et al.

(10) Patent No.: US 11,540,298 B2
(45) Date of Patent: Dec. 27, 2022

(54) DYNAMIC 5G NETWORK SLICING TO MAXIMIZE SPECTRUM UTILIZATION

(71) Applicant: Microsoft Technology Licensing, LLC, Redmond, WA (US)

(72) Inventors: Manikanta Kotaru, Kenmore, WA (US); Paramvir Bahl, Bellevue, WA (US); Arjun Varman Balasingam, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 17/326,731

(22) Filed: May 21, 2021

(65) Prior Publication Data

US 2022/0377751 A1 Nov. 24, 2022

(51) Int. Cl.
*H04W 72/12* (2009.01)
*H04W 72/04* (2009.01)

(52) U.S. Cl.
CPC ....... *H04W 72/12* (2013.01); *H04W 72/0446* (2013.01); *H04W 72/0453* (2013.01)

(58) Field of Classification Search
CPC .......................... H04W 72/12; H04W 72/0453
USPC ....................................................... 370/329
See application file for complete search history.

(56) References Cited

U.S. PATENT DOCUMENTS

2021/0091838 A1  3/2021  Bai et al.

OTHER PUBLICATIONS

"International Search Report & Written Opinion issued in PCT Application No. PCT/US22/026853", dated Jul. 27, 2022, 12 Pages.
Ravi, et al., "RAN Slicing in Multi-MVNO Environment under Dynamic Channel Conditions", In Repository of arXiv:2104.04900v1, Apr. 11, 2021, 10 Pages.

*Primary Examiner* — Angel T Brockman
(74) *Attorney, Agent, or Firm* — Mark K. Young; Mayer & Williams, PC

(57) ABSTRACT

In a 5G network, a slice controller operating in a radio access network (RAN) is arranged to make predictions of channel state information (CSI) for user equipment (UE) on the network using a predictive propagation model. The slice controller uses the predicted CSI to schedule subcarriers and time slots associated with physical radio resources for data transmission on slices of the 5G network between a 5G radio unit (RU) and the UE to maximize network throughput on a slice for the radio spectrum that is utilized for a given time period. In view of the CSI predictions, the slice controller controls operations of the MAC (Medium Access Control) layer functions based on PHY (physical) layer radio resource subsets to schedule the subcarrier and time slots for data transmissions on a slice over the 5G air interface from RU to UE.

20 Claims, 22 Drawing Sheets

800

1300

1500

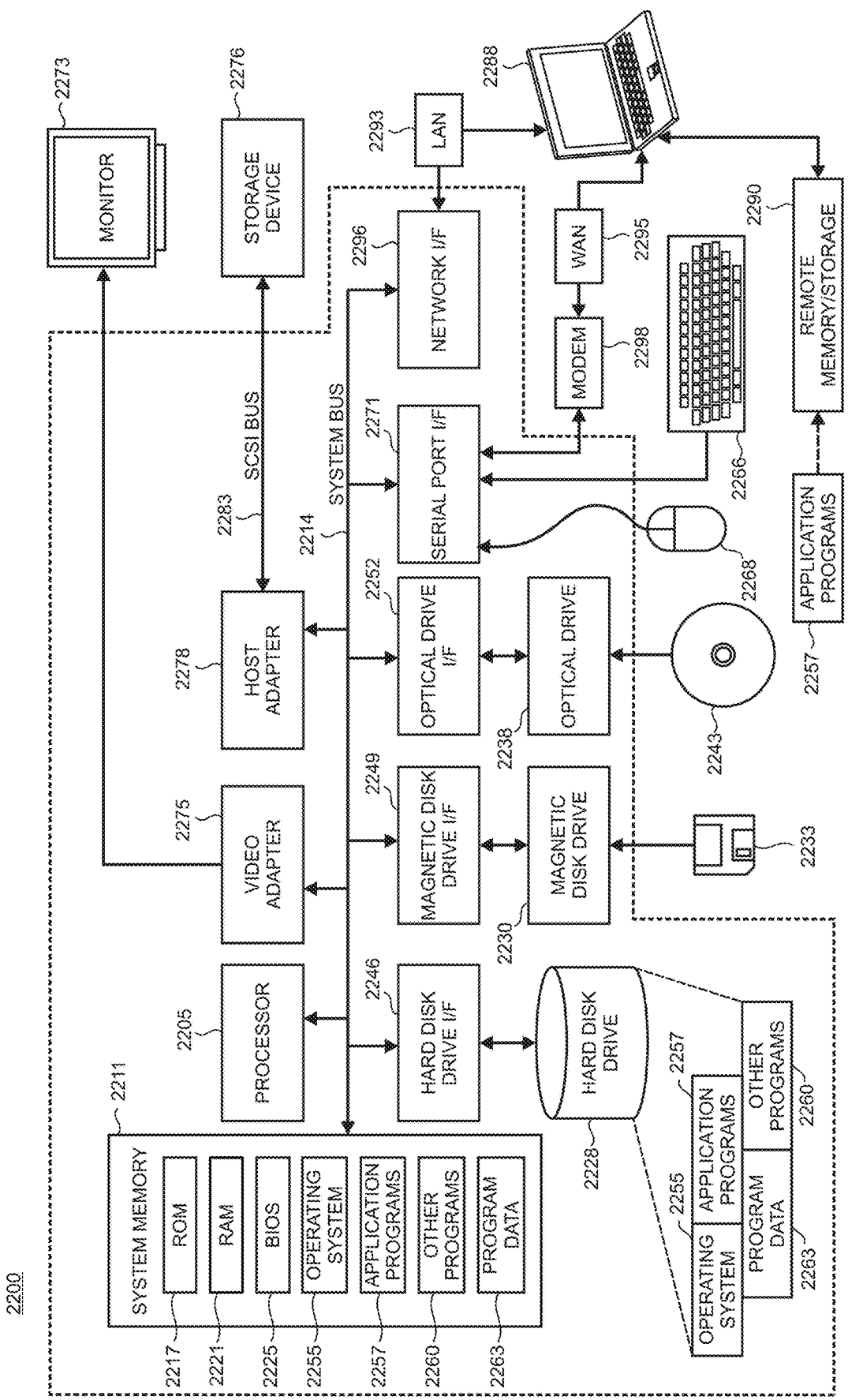

DYNAMIC 5G NETWORK SLICING TO MAXIMIZE SPECTRUM UTILIZATION

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near real-time management and control of critical business operations.

SUMMARY

In a 5G network, a slice controller operating in a radio access network (RAN) is arranged to make predictions of channel state information (CSI) for user equipment (UE) on the network. The slice controller uses the predicted CSI to schedule subcarriers and time slots associated with physical radio resources for data transmission on slices of the 5G network between a 5G radio unit (RU) and the UE to maximize network throughput on a slice for the radio spectrum that is utilized for a given time period. The slice controller may use a model to make the CSI predictions. In one illustrative embodiment the model may comprise a predictive propagation model using reinforcement learning that can be updated using online channel information data or by using a model based on offline data sources. Using the CSI predictions, the slice controller controls operations of the MAC (Medium Access Control) layer functions based on PHY (physical) layer radio resource subsets to schedule the subcarrier and time slots for data transmissions on a slice over the 5G air interface from RU to UE.

The slice controller advantageously operates to allocate spectrum to meet dynamic data demands of UE across each of various slices of the 5G air interface while maximizing throughput and utilization of spectrum, which is a finite commodity. The inventive slice controller uses the CSI predictions to schedule transmissions using optimal combinations of subcarrier and time slots for radio resources from the physical infrastructure underlying the 5G network to enable operators and service providers to efficiently and flexibly utilize 5G network capacity to maximum technical and economic advantage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 22 is a simplified block diagram of an illustrative computer system that may be used at least in part to implement the present dynamic 5G network slicing to maximize spectrum utilization.

Like reference numerals indicate like elements in the drawings. Elements are not drawn to scale unless otherwise indicated.

Figure 1:
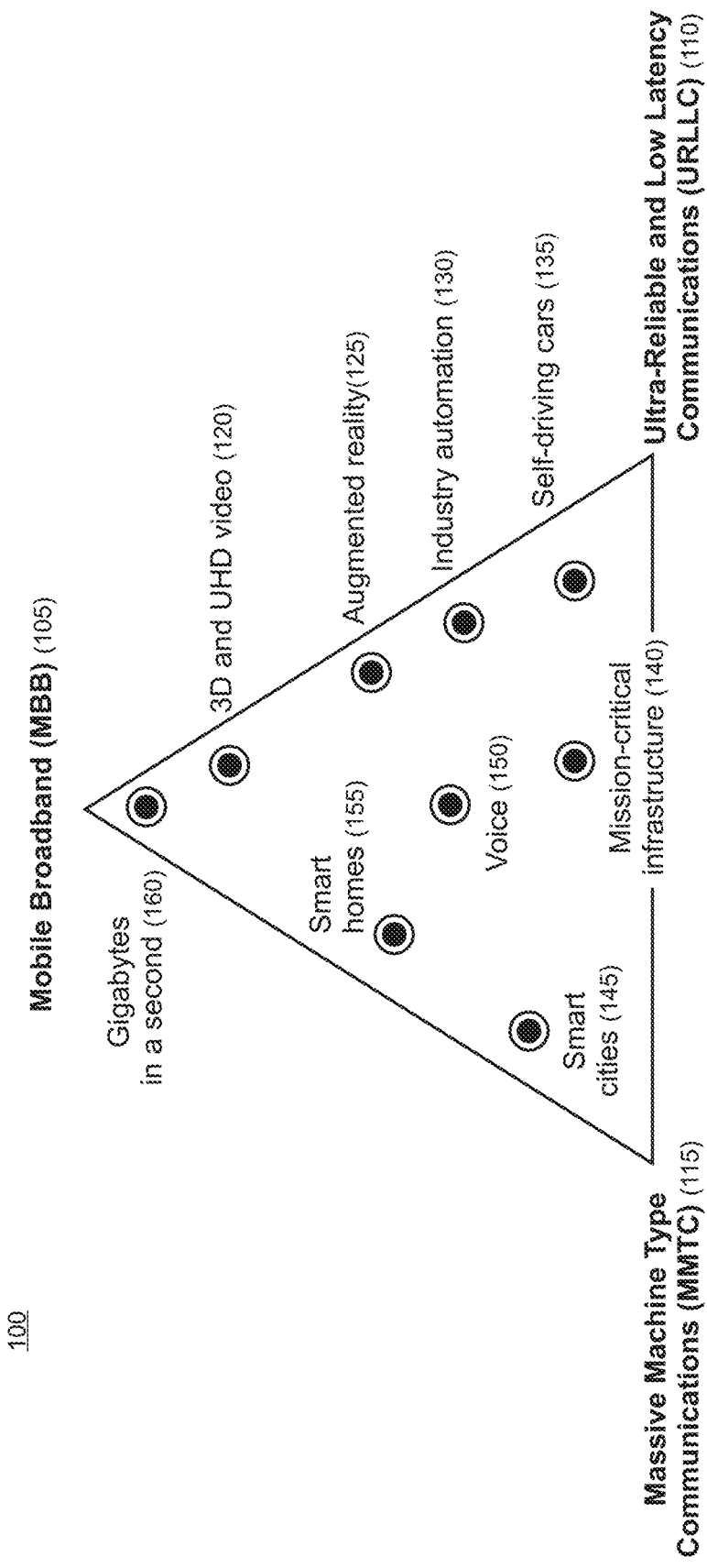
FIG. 1 shows illustrative 5G network usage scenario footprint examples.

DETAILED DESCRIPTION 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000@, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario examples 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario 115 may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or predefined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance requirements of a particular service class or application that may meet some predefined service level agreement (SLA). Each portion of the 5G network is respectively sliced such that the network can be viewed as being composed of air interface slices, RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
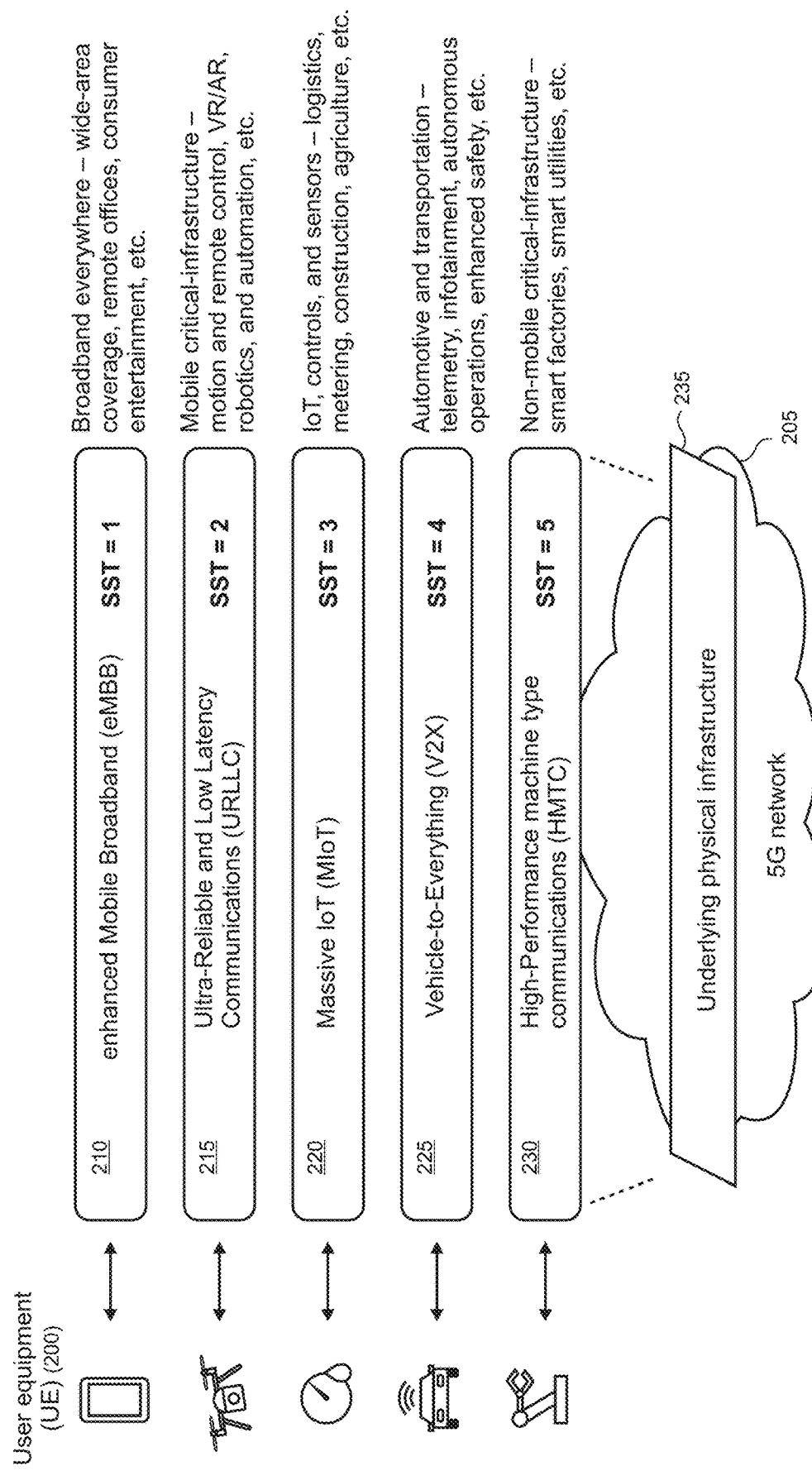
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. 3GPP also defines additional standardized SST values for V2X (Vehicle-to-Everything) (SST=4) and HMTC (High-Performance Machine Type Communications) (SST=5). It may be appreciated that slice service types beyond those having standardized SST values can be defined.

The five standardized service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized slice may also be supported by other slices having other (i.e., non-standard) SST values.

FIG. 2 shows user equipment (UE) 200 that may be representative of the wide variety of device types that may utilize 5G networking, including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
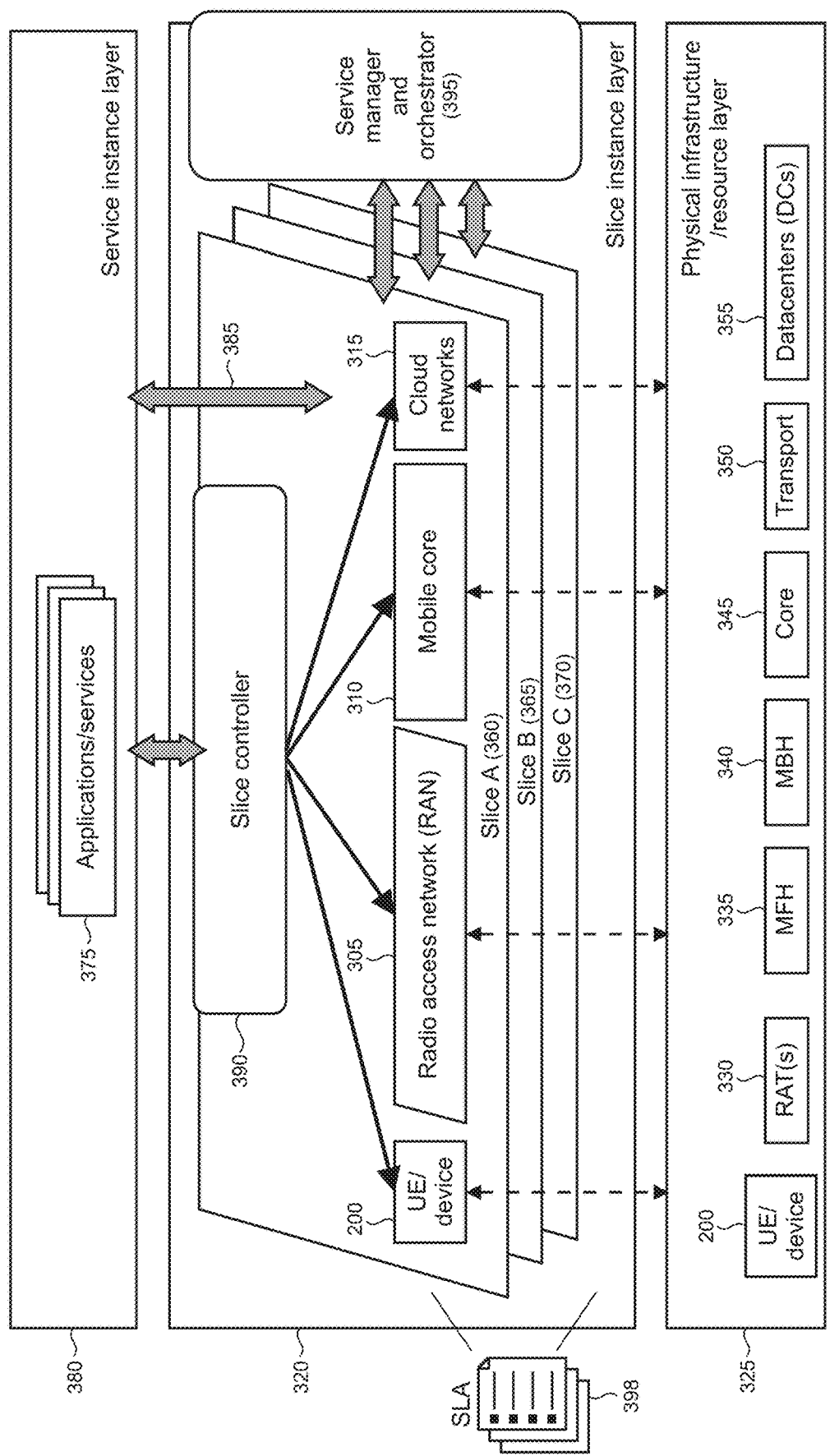
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the slice types shown in FIG. 2 and described in the accompanying text or comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet predefined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context, and maintaining communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees in some implementations.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present dynamic 5G network slicing methodologies, typically depending on applicable circumstances and context. For example, customers may include, but are not limited to consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 4:
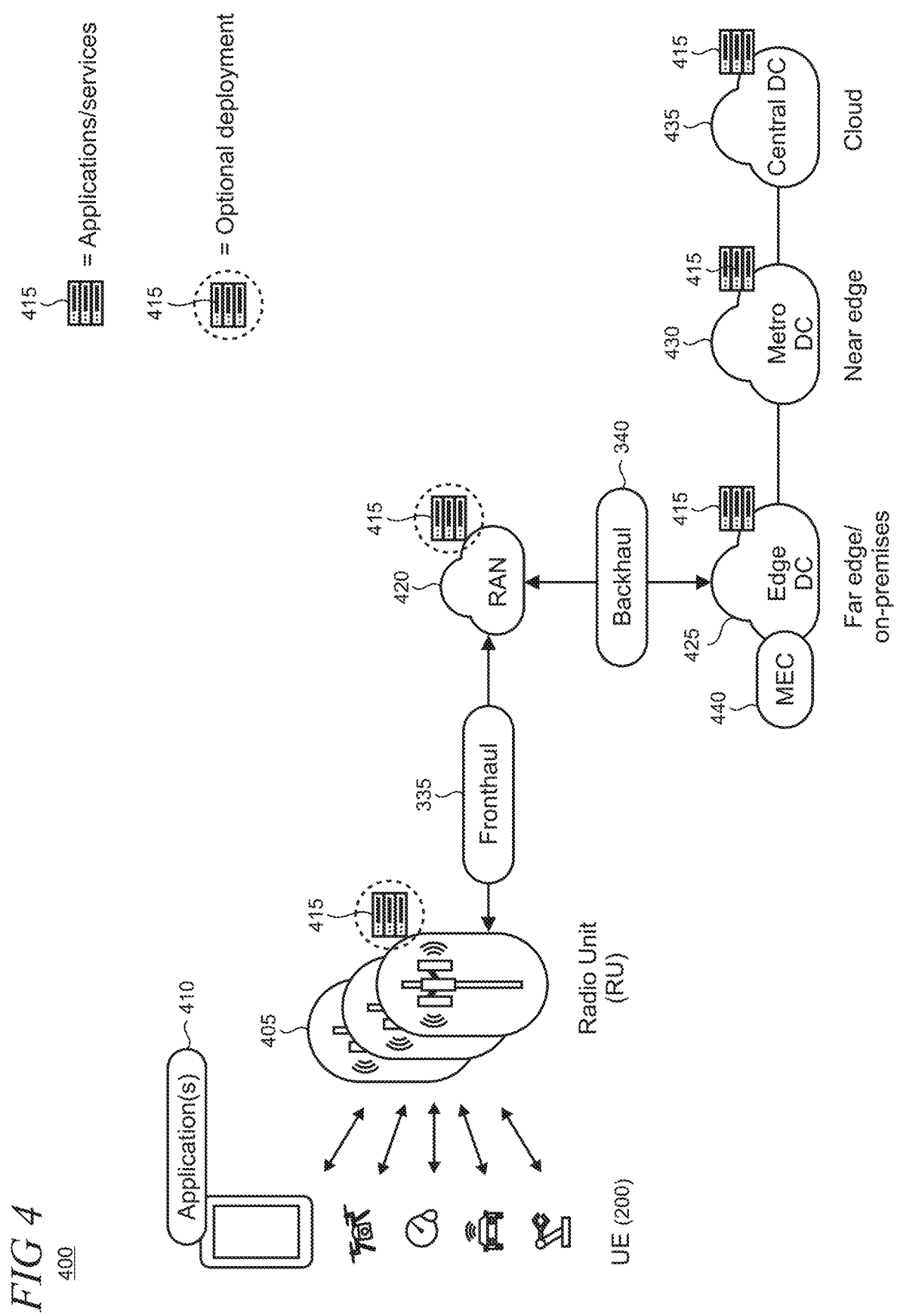
FIG. 4 shows illustrative physical infrastructure in a 5G network architecture.

FIG. 4 shows illustrative physical infrastructure in a 5G network architecture 400. Multiple instances of a radio unit (RU) 405 are configured to interact with a diverse population of UE 200. Each UE typically includes one or more local applications 410 or client-side software/firmware component that is arranged to interface with one or more remote application servers, service providers, or other resources (collectively indicated by reference numeral 415) and thus require network connectivity to such remote facilities.

The RUs are coupled by the mobile fronthaul 335 to a RAN 420. The RAN is coupled by the mobile backhaul 340 to one or more datacenters (DCs). In this illustrative example, the DCs comprise an edge DC 425, a metro DC 430, and a central DC 435. In some 5G networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 440.

The application servers 415 can be located at various points in the network architecture 400 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 420 or RU 405, as indicated by the dashed circles in FIG. 4.

Figure 5:
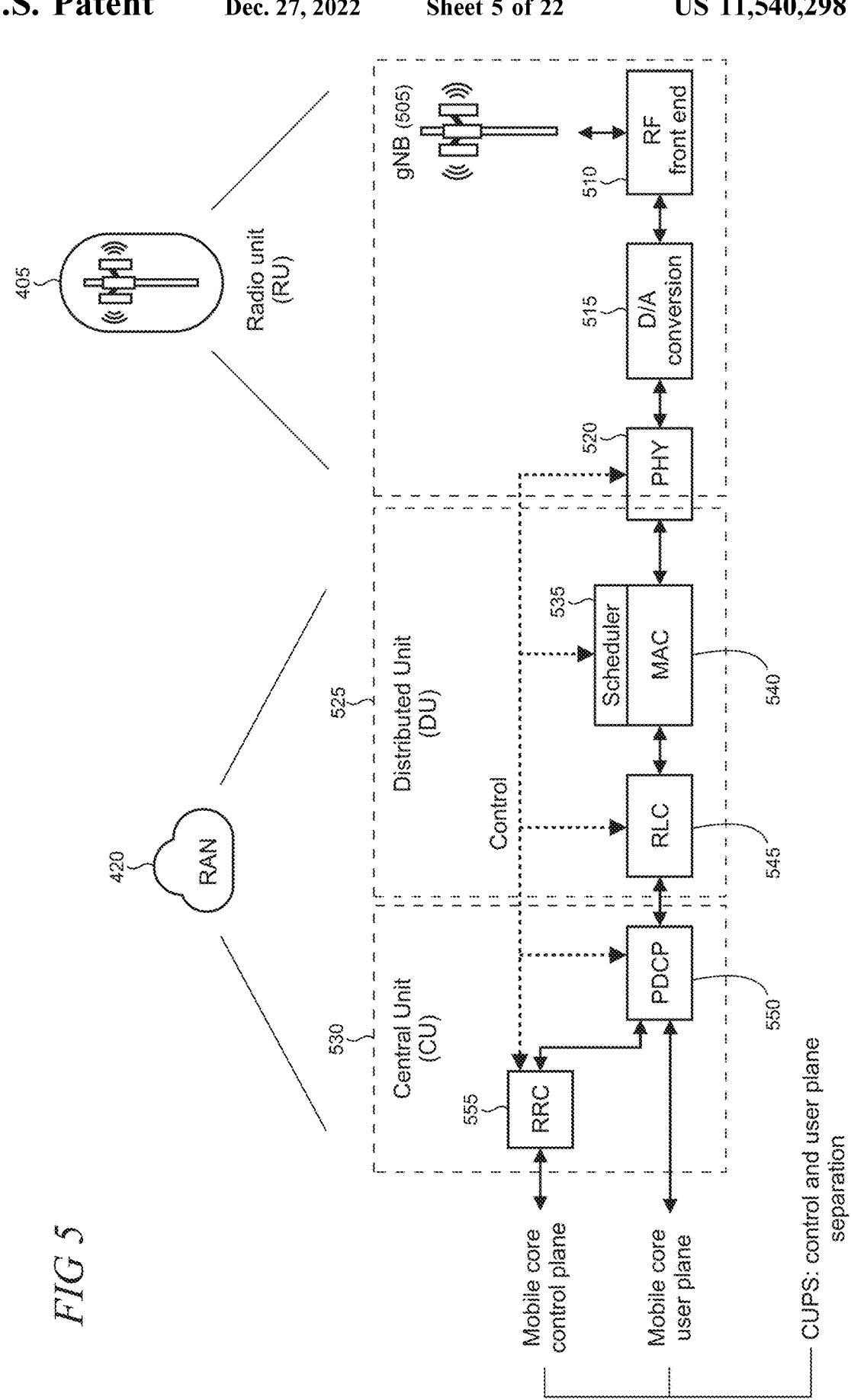
FIG. 5 shows an illustrative 5G radio access network (RAN) and radio unit (RU)

FIG. 5 shows functional blocks of the RAN 420 and RU 405. The RU comprises radio transmission points, for example, a next generation Node B, gNB 505, which handles radio communications with the UE. The gNB is serially coupled to a radio frequency (RF) front end 510, a digital to analog (D/A) conversion unit 515, and a portion of the functionality of the physical (PHY) layer 520 as described in the OSI Open Systems Interconnection model.

Under 3GPP and O-RAN (Open RAN) Alliance, the processing pipeline of the RAN 420 is split into a distributed unit (DU) 525, and a central unit (CU) 530. The DU is responsible for real-time layers 1 and 2 (L1 and L2) scheduling functions, and the CU is responsible for non-real-time, higher L2 and L3 functions. Accordingly, the DU comprises a scheduler 535 located on top of a MAC (Medium Access Control) layer component 540, an RLC (radio link control) layer component 545, and parts of a PHY (physical) layer component 520. The MAC layer component is responsible for buffering, multiplexing and demultiplexing segments, including all real-time scheduling decisions regarding which segments are transmitted when. It is also able to make a "late" forwarding decision (i.e., to alternative carrier frequencies, including Wi-Fi, for example). The PHY layer component is responsible for coding and modulation.

The CU 530 is configured with a PDCP (Packet Data Convergence Protocol) layer component 550 and RRC (Radio Resource Control) layer component 555. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the mobile core control plane while the PDCP layer component interfaces with the user plane to thereby implement the "CUPS" (control and user plane separation) feature of 5G.

Figure 6:
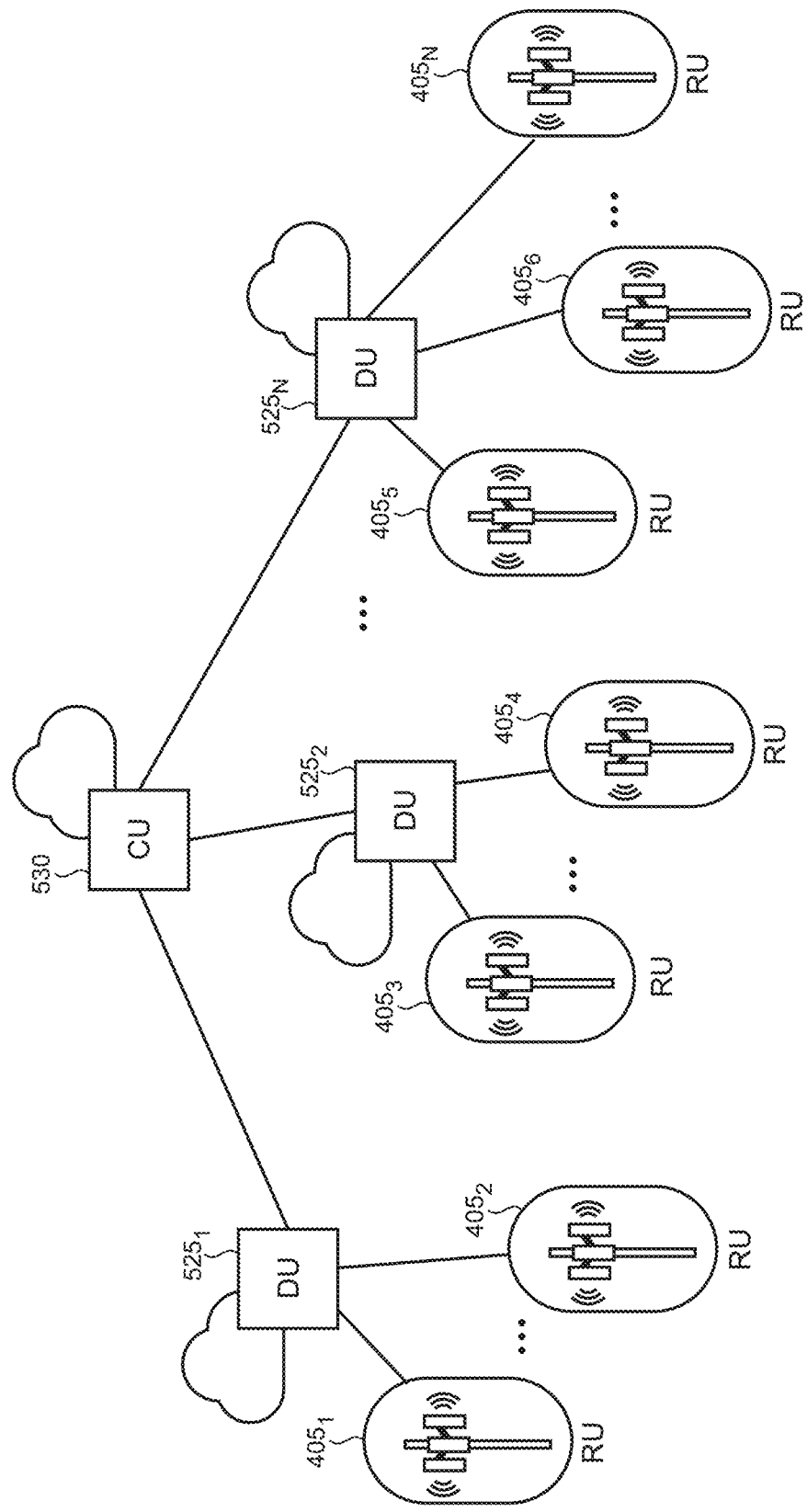
FIG. 6 shows an illustrative split-RAN hierarchy in which a central unit (CU) may support multiple distributed units (DUs) which, in turn, may support multiple RUs.

The split-RAN configuration shown in FIG. 5 enables RAN functionality to be split among physical infrastructure elements in centralized and distributed locations. For example, as shown in FIG. 6, a single CU 530 may be configured to serve multiple DUs 525, each of which in turn serves multiple RUs 405.

Figure 7:
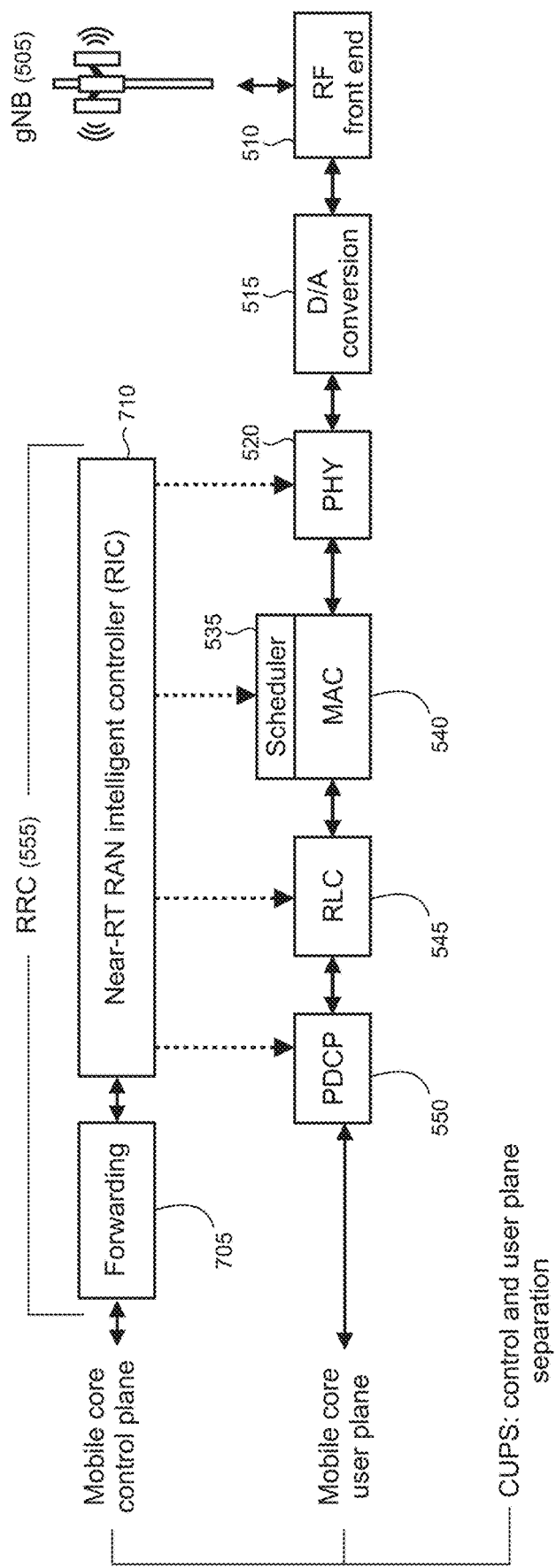
FIG. 7 shows an illustrative radio resource control (RRC) that is disaggregated into a mobile core-facing control plane component and a near-real-time RAN intelligent controller (near-RT RIC)

FIG. 7 shows that the RRC layer component 555 may be disaggregated into a mobile core-facing control plane forwarding component 705 and a near-real-time (RT) controller RAN intelligent controller (RIC) 710. The RRC layer component is thus responsible for only near-real-time configuration and control decision making, while the scheduler 535 on the MAC component 540 is responsible for real-time scheduling decisions.

Figure 8:
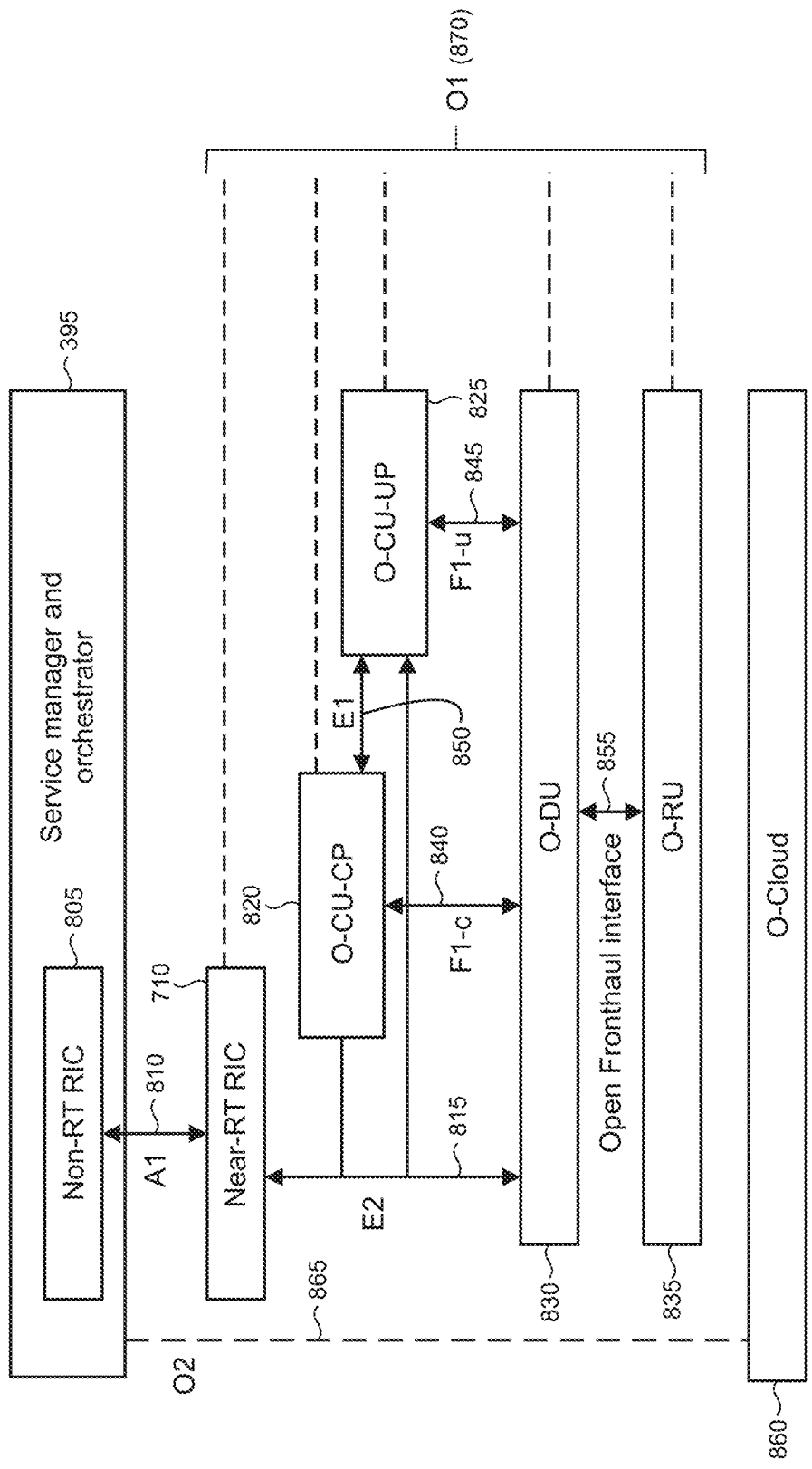
FIG. 8 shows an illustrative RAN operations and maintenance (OAM) logical architecture as described by the O-RAN (Open Radio Access Network) Alliance.

FIG. 8 shows an illustrative RAN operations and maintenance (OAM) logical architecture 800, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 805 may be incorporated into the service manager and orchestrator 395. The non-RT RIC interoperates with a near-RT RIC 710 through an A1 interface 810.

The near-RT RIC 710 is coupled over an E2 interface 815 with network functions for radio access control and optimization including the O-CU-CP (O-RAN Central Unit-Control Plane) 820, O-CU-UP (O-RAN Central Unit-User Plane) 825, and O-DU 830. The O-CU-CP and O-CU-UP are respectively coupled to the O-DU over F1-c and F1-u interfaces, 840 and 845, as defined and maintained by 3GPP.

The O-CU-CP is coupled to the O-CU-UP over a 3GPP E1 interface 850. The O-DU and O-RU 835 are coupled using an Open Fronthaul interface 855 (also known as a lower layer split (LLS) interface).

The O-Cloud 860 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 865. An O1 interface 870 is provided to each of the near-RT RIC, O-CU-CP, O-CU-UP, O-DU, and O-RU, as shown in FIG. 8.

Figure 9:
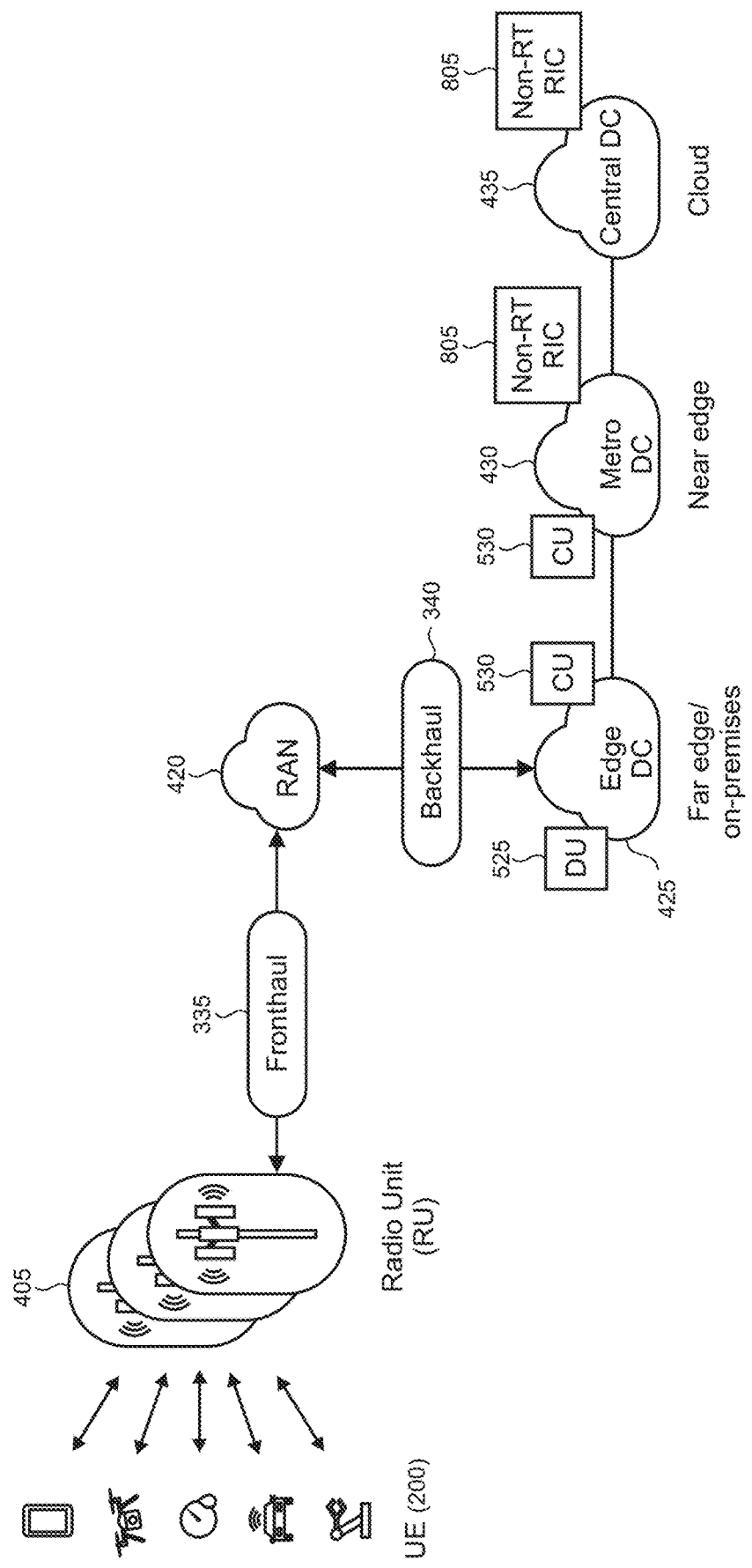
FIG. 9 shows an illustrative 5G implementation in which split-RAN functional units and instances of the non-real-time RIC (non-RT RIC) may be distributed among physical infrastructure components.

The splitting of functional elements among the DU, CU, near-RT RIC, and non-RT RIC, as discussed above, enables flexible deployment of instances of such elements in the physical infrastructure that underlies a typical 5G network. FIG. 9 shows an illustrative 5G implementation in which split-RAN functional units and instances of the non-RT RIC may be distributed among physical infrastructure components. For example, as shown, a DU 525 and CU 530 may be located at the edge DC 425. A CU 530 and non-RT RIC 805 may be located in the metro DC 430. The central DC 435 can also host a non-RT RIC in some cases.

Figure 10:
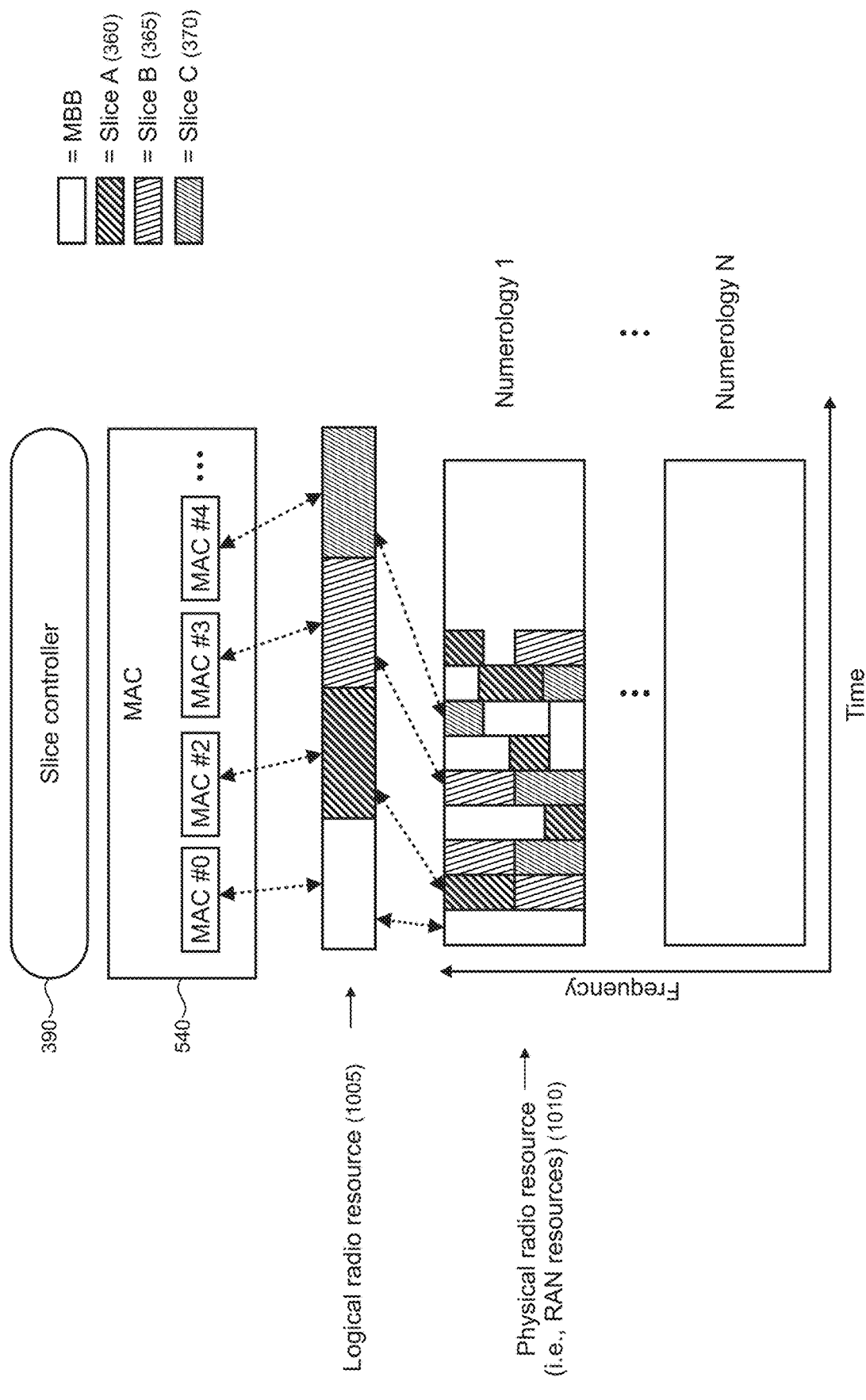
FIG. 10 shows an illustrative slice controller that may be configured to allocate physical radio resources among RAN slices.

FIG. 10 shows the slice controller 390 as illustratively configured to allocate physical radio resources among network slices. The slice controller may be instantiated, for example, as a component of the near-RT RIC 710 (FIG. 7) to thereby implement or combine the functionality of the scheduler 535 (FIG. 5). In alternative implementations, part of the slice controller may be distributed outside the near-RT RIC, for example, in a CU in an edge or metro DC, or included in one or more other functional elements of the 5G network architecture. In some implementations, dynamically optimized RAN actions to ensure SLA guarantees may be performed in the near-RT RIC while longer term SLA assurance can be handled in the non-RT RIC.

The slice controller 390 is arranged to control operations of the MAC component 540 based on logical representations 1005 of a radio resource in the PHY component 520 (FIG. 5). As shown, the MAC component 540 performs intra-slice resource allocation. More specifically, the physical radio resource 1010 is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented, as shown in FIG. 10, using dimensions comprising frequency and time. In 5G, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each sub-frame. It may be appreciated that spatial multiplexing, referred to as MIMO (multiple input, multiple output), may also be utilized to provide additional layers of RAN resources that the slice controller may allocate in some implementations.

Figure 11:
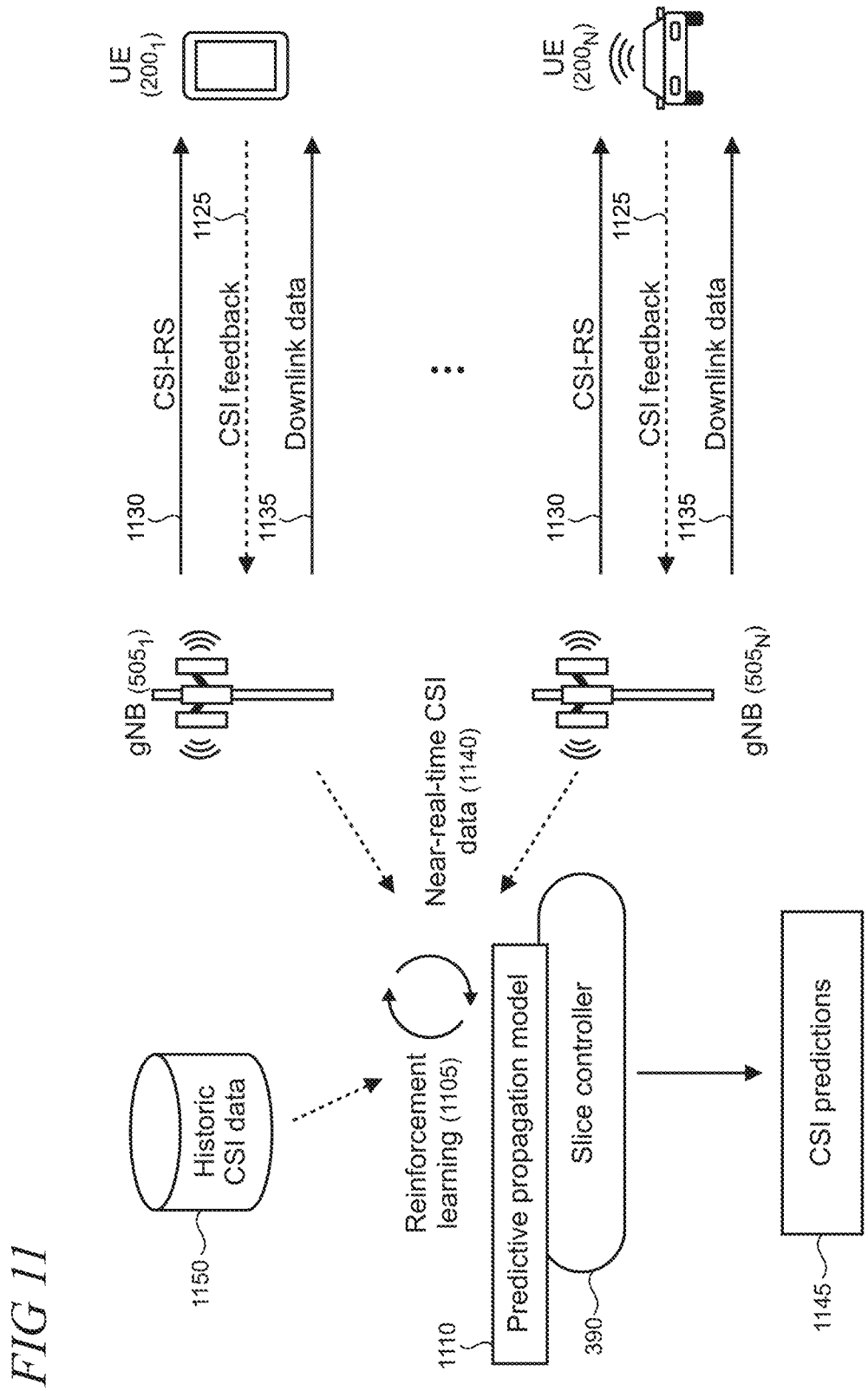
FIG. 11 shows online and offline CSI (channel state information) that is illustratively utilized by a slice controller to generate predicted CSI data using a predictive propagation model that utilizes reinforcement learning.

As illustratively shown in FIG. 11, the slice controller 390 may be configured to utilize channel state information (CSI) that it collects from online sources 1140 of channel information data to update a predictive propagation model 1110 that may implement reinforcement learning (indicated by reference numeral 1105). Alternatively, a predictive propagation model can be based on offline CSI data sources 1150. CSI parameters are the quantities related to the state of a 5G radio channel that are reported by the UE 200 to a gNB 505 as feedback 1125. The CSI feedback includes several parameters to report dynamic channel conditions between the UE and gNB, such as the CQI (channel quality indicator), the PMI (precoding matrix indicator) with different codebook sets, and the rank indicator (RI). The channel state information reference signal (CSI-RS) 1130 is used to measure the CSI feedback.

The CSI-RS is transmitted by the gNB as a known reference signal which the UE measures and then reports the radio channel properties back to the gNB. Channel conditions are typically reasonably stable with completely stationary UE. With limited changes in multipath propagation, most channel variations should come from interference from other cells or UE. However, mobile UE may experience vastly different and rapidly changing radio conditions, especially as they may move in and out of a line of sight to the gNB. When the gNB receives the CSI parameters from the UE, it can schedule the downlink data transmissions 1135 (such as modulation scheme, code rate, number of transmission layers, and MIMO precoding) accordingly.

The CSI data can be collected online at the slice controller 390 as near-real-time data 1140, for example from the O-DU 830 (FIG. 8) over the E2 interface 815 and used in the predictive propagation model 1110 to generate CSI predictions 1145. These predictions are utilized by the slice controller to determine RAN admission in response to an admission request from an application/UE, as discussed below. Alternatively, a predictive propagation model can be based on CSI data from offline sources 1150. It may be appreciated that various combinations of online and/or offline CSI data, learning methods, algorithms, and/or predictive models may be utilized to make CSI predictions to meet the needs of particular implementations of 5G network admission. In addition, machine learning and/or artificial intelligence may also be utilized for the CSI predictions in some implementations.

Figure 12:
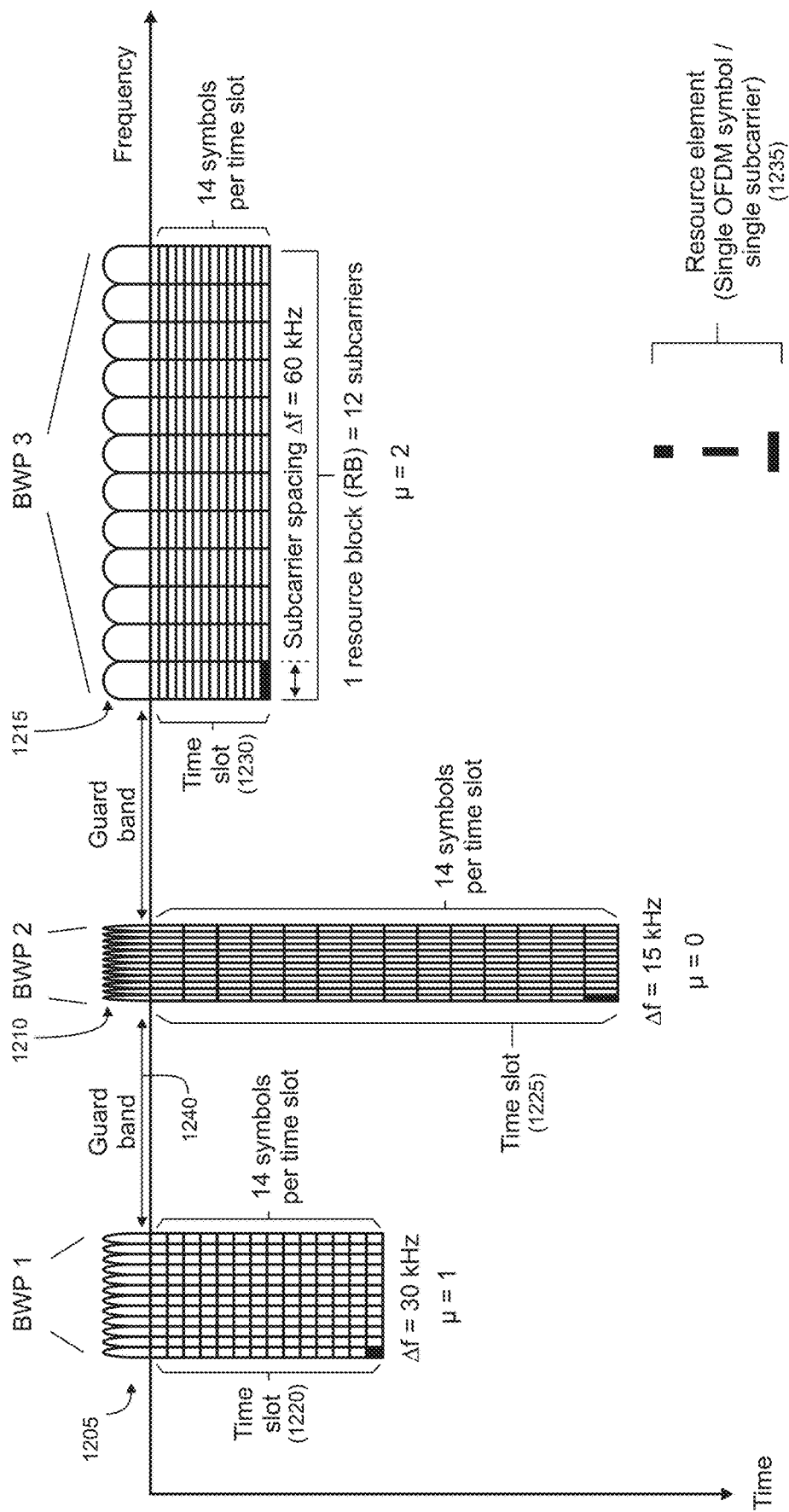
FIG. 12 shows illustrative bandwidth parts (BWP) associated with respective numerologies.

Each numerology may have a defined bandwidth part (BWP) that can have various parameters including subcarrier spacing, OFDM (orthogonal frequency-division multiplexing) symbol duration, and cyclic prefix (CP) length. A BWP is a contiguous set of physical resource blocks (RBs) for a given carrier. The RBs are selected from a contiguous subset of common RBs for a given numerology, $\mu$. FIG. 12 shows illustrative BWPs 1205, 1210, and 1215 associated with respective numerologies, $\mu=0$, 1, and 2. Frequency is shown on the horizontal axis and time is shown on the vertical axis.

It may be appreciated that a wider bandwidth may have a direct impact on the peak and user experienced data rates, however users are not always demanding high data rates. The use of wide bandwidth may imply higher idling power consumption both from RF and baseband signal processing perspectives in some cases. Thus, the concept of BWP has been introduced in 5G to thereby operate UEs with smaller bandwidth than the configured channel bandwidth, which enables the 5G air interface to be efficient while still supporting wideband operations. BWPs provide flexibility so that multiple, different signal types can be sent in a given bandwidth. Most gNBs can utilize the wider bandwidths available in 5G. UE capabilities, however, can be expected to vary and it will be more challenging for some UEs to use the larger available bandwidths. BWPs enable multiplexing of different signals and signal types for better utilization of spectrum.

Per 3GPP release 15, a given UE can be configured with a maximum of four BWPs for downlink and uplink but at a given point in time only one BWP is active for downlink and one for uplink. The BWP concept enables UEs to operate in narrow bandwidth and when a user demands more data (e.g., for bursts of traffic) it can inform the RU to enable wider bandwidth. In typical situations, UEs are expected to receive and transmit only within the frequency range configured for the active BWPs with the associated numerologies.

As shown in FIG. 12, each BWP 1205, 1210, and 1215 has a different subcarrier spacing. In 5G, subcarrier spacings of 15 kHz ($\mu=0$), 30 kHz ($\mu=1$), 60 kHz ($\mu=2$), 120 kHz ($\mu=3$), and 240 kHz ($\mu=4$) are supported. Downlink and uplink transmissions are organized into frames with 10 ms duration, each consisting of ten subframes of 1 ms. Each frame is divided into two equally-sized half-frames of five subframes each with half-frame 0 consisting of subframes 0-4 and half-frame 1 consisting of subframes 5-9. In Total, there are 10 subframes in one frame.

The lengths of the respective time slots 1220, 1225, and 1230 are different depending on different subcarrier spacing with slot length getting shorter as subcarrier spacing gets wider. The number of time slots per subframe varies with carrier spacing—with 1, 2, 4, 8, or 16 slots per subframe. The physical radio resources 1010 (FIG. 10) are depicted in FIG. 12 by the filled rectangles which represent the smallest unit of resource—the resource element 1235—which comprises a single OFDM symbol and a single subcarrier.

The utilization of mixed numerologies in 5G provides additional flexibility to efficiently serve requirements of diverse usage scenarios. However, inter-numerology interference (INI) can arise between multiplexed numerologies. INI can cause, for example, a loss of orthogonality among subcarriers of different numerologies in the frequency domain and may cause difficulties in OFDM symbol alignment in the time domain. Controlling and reducing INI may typically be performed using one or more techniques including, for example, windowing and filtering. Guard bands (representatively indicated by reference numeral 1240 in FIG. 12) may also be inserted between adjacent sub-bands utilizing different numerologies to minimize the effects of IN in the system.

Figure 13:
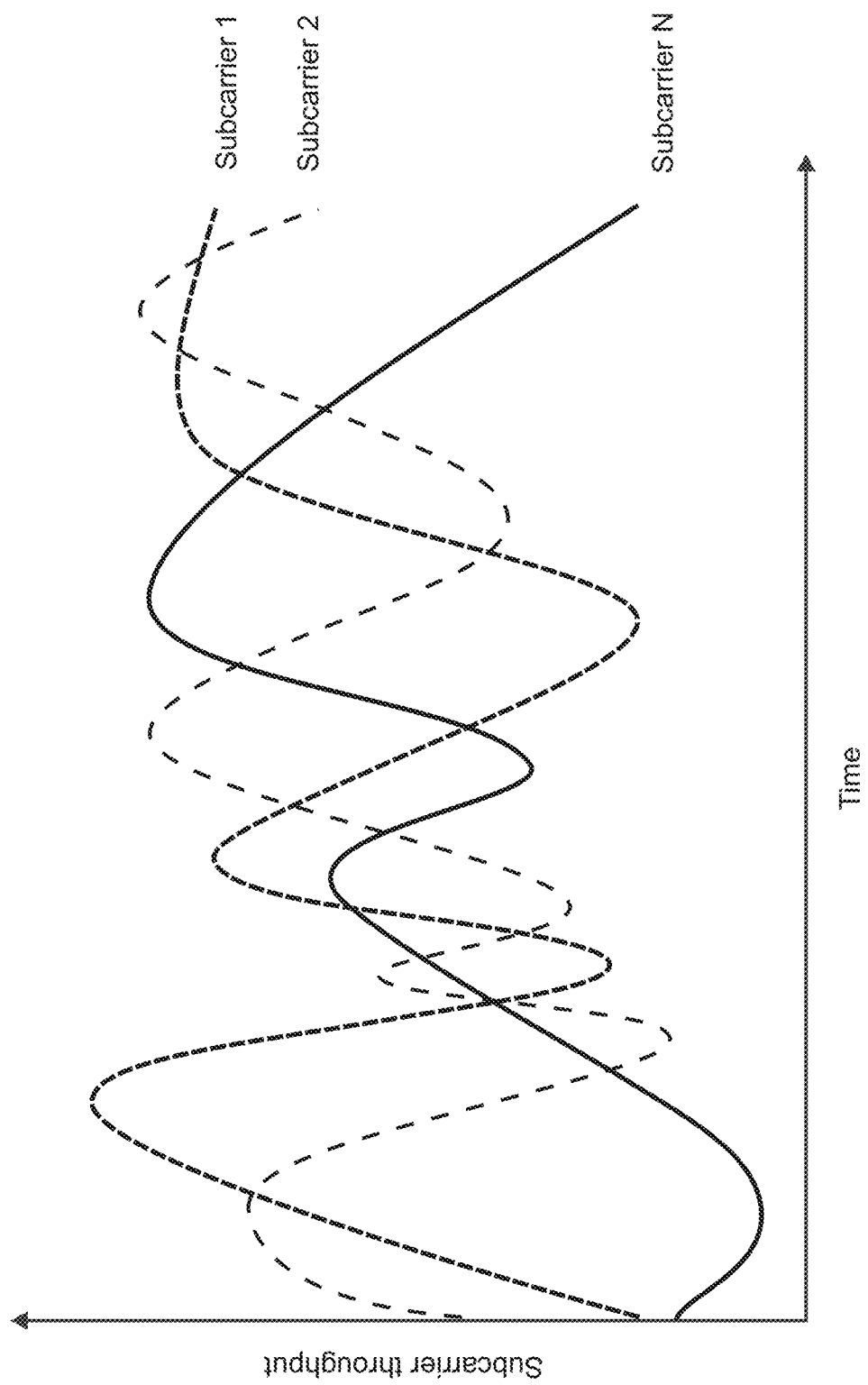
FIG. 13 shows an illustrative graph depicting the variation in throughput over time for different subcarriers.

FIG. 13 shows an illustrative graph 1300 depicting the variation in throughput over time for three different subcarriers 1, 2, N. Throughput can vary in the wireless 5G environment for various reasons such as received signal strength attenuation between transmitter and receiver, signal reflection and scattering, interference, and multipath fading. The net effect of these variations of the wireless channel is a lower signal-to-noise ratio, which leads to a high error rate and a reduction in the effective data rate, or throughput, between the RU and UE. Accordingly, 5G networks require special strategies to combat fading at the PHY layer, and intelligent scheduling schemes to provide radio resource allocation that maximizes spectrum utilization and throughput.

Figure 14:
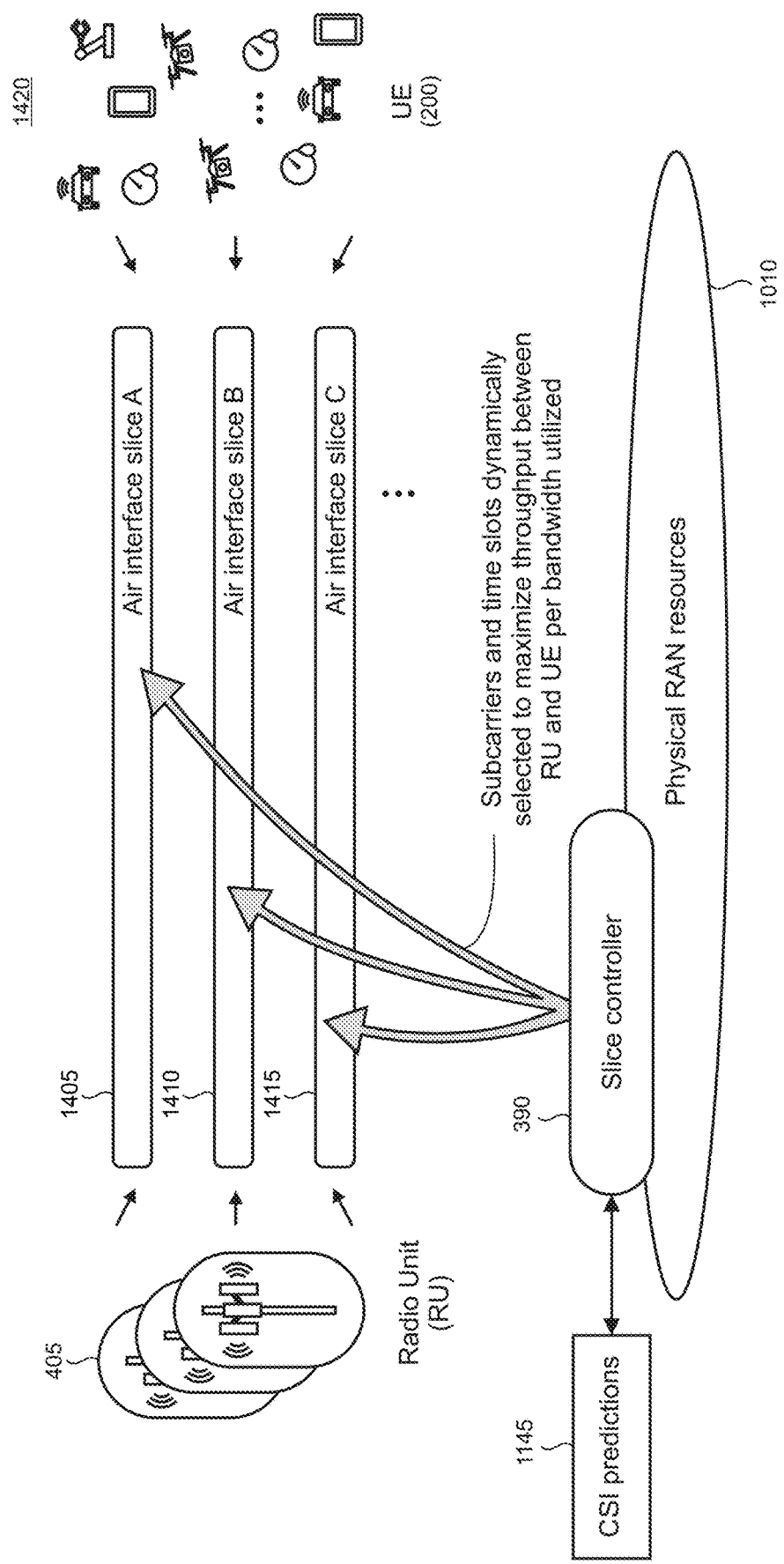
FIG. 14 shows an illustrative slice controller scheduling time slots and subcarriers for transmissions among slices of an air interface in a 5G network to maximize throughput between the RU and UE per bandwidth that is utilized.

FIG. 14 shows the slice controller 390 scheduling RAN radio resources 1010 among slices 1405, 1410, and 1415 of the 5G air interface between a population 1420 of UE 200 and RU 405 in accordance with principles of the present invention. The scheduling comprises dynamically selecting particular subcarriers and time slots for use in transmitting queued data traffic (not shown) between the RU and UE. The slice controller uses the CSI predictions 1145 to deterministically select the particular subcarriers and time slots to schedule the data traffic for transmission by the PHY layer 520 (FIG. 5).

The scheduling techniques employed by the slice controller 390 are designed to maximize total throughput over the 5G air interface between the RU and UE for a given slice for which the RAN resources in the PHY layer are allocated per bandwidth utilized. It may be appreciated that INI may be managed by utilization of suitable guard bands between slices. The slice controller thus provides more optimal scheduling to maximize spectrum utilization compared to conventional scheduling algorithms, such as round robin, that do not maintain awareness of channel conditions and which may be configured to emphasize other performance metrics. In addition, the present scheduling techniques provide further technical advantages by using the predicted (i.e., future) channel conditions which enables more accurate optimization of spectrum utilization. As all schedulers need to work ahead of time in the MAC layer to allocate time slot x+d (where d is a configurable delay time for processing) while the PHY layer is transmitting a particular time slot x over the air, the utilization of a prediction of a future event more closely aligns future transmissions with appropriate channel conditions to maximize throughput per slice for the given bandwidth utilized.

Figure 15:
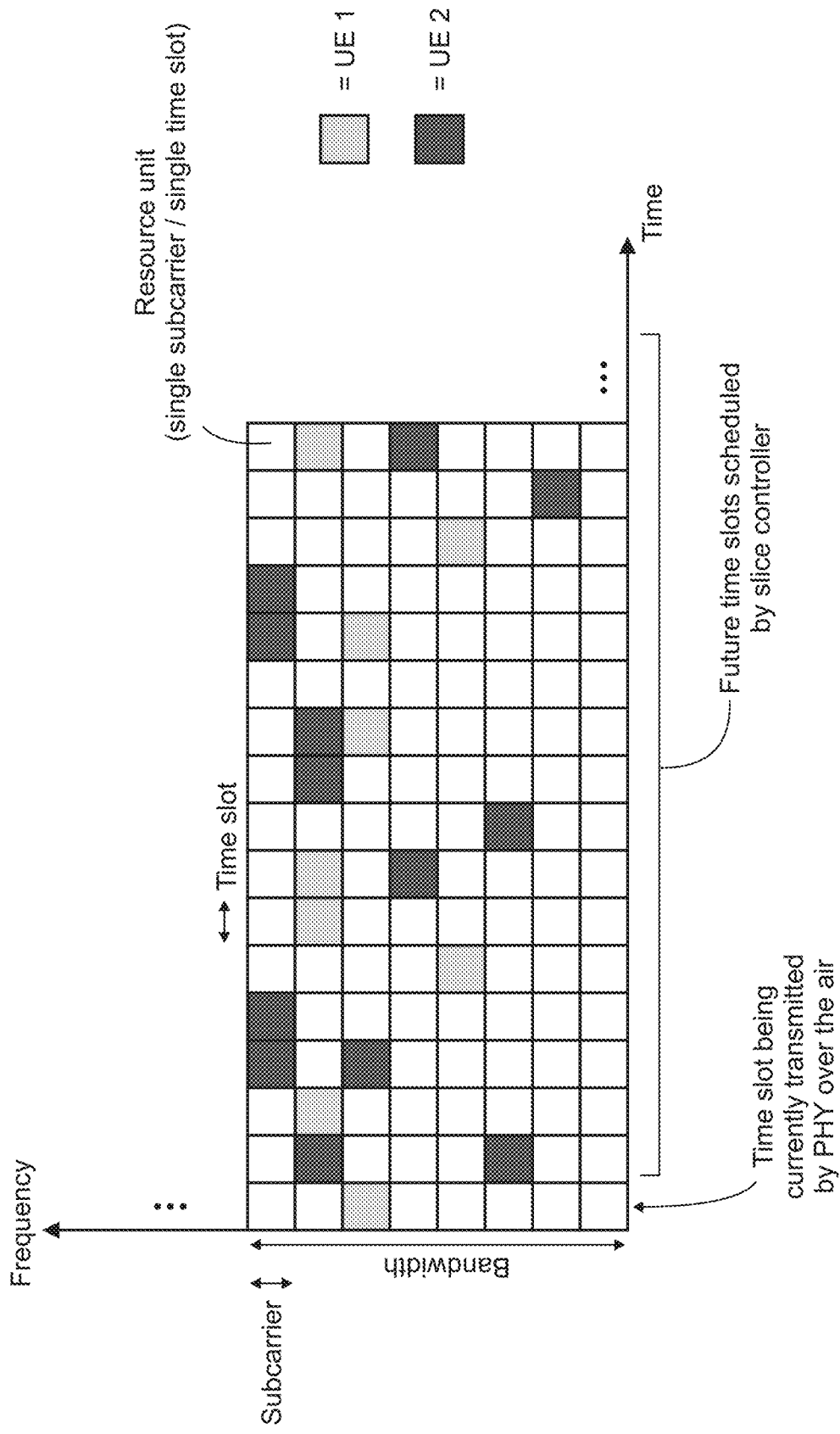
FIG. 15 is an illustrative scheduling matrix that shows how data transmissions for particular UE are scheduled by selecting subcarriers and time slots.

FIG. 15 is an illustrative scheduling matrix 1500 that shows how data transmissions for particular UE are scheduled by the slice controller by selecting subcarriers and time slots for a given slice. Bandwidth is displayed on the vertical axis and time is displayed on the horizontal axis. Each square in the matrix represents an arbitrarily-represented unit of physical radio resource that is defined by a single subcarrier and a single time slot. It will be appreciated however that the presentation in FIG. 15 is chosen to aid clarity in exposition of the present principles and that the scheduling matrix could also be represented using different dimensions. In addition, the matrix shows two UE, but it will be appreciated that the scheduling may be performed for more than two in typical implementations.

As the PHY layer 520 (FIG. 5) is transmitting the current time slot (i.e., located in the first column of the matrix 1500), the slice controller is selecting a particular subcarrier and time slot for future transmissions of data that are queued for handling. As the slice controller is optimizing scheduling for maximum throughput and spectrum utilization for a slice based on the predicted channel conditions from the CSI predictions, not every available subcarrier and time slot in the matrix is necessarily utilized. Subcarriers may be selected across BWP and numerologies in some cases.

Figure 16:
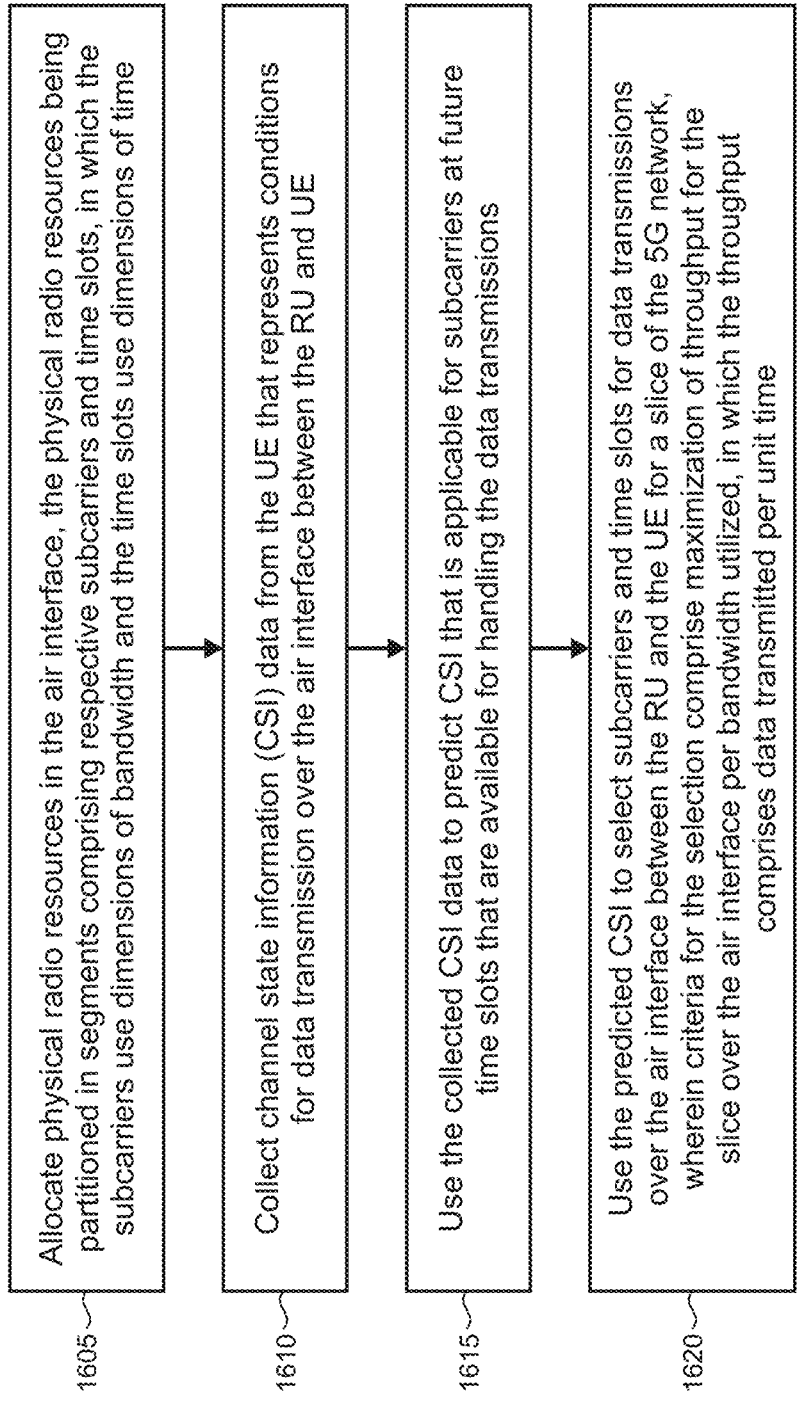
FIGS. 16, 17, and 18 show illustrative methods that may be performed when implementing the present dynamic 5G network slicing to maximize spectrum utilization.

FIG. 16 is a flowchart of an illustrative method 1600 that may be performed in a 5G network for scheduling data transmissions on an air interface that is established between an RU and a plurality of UE in which the 5G network comprises a plurality of slices. The method 1600 may be performed, for example, by the slice controller 390 (FIG. 1) or by another suitable component or functionality disposed in the near-RT RIC 710 (FIG. 7). Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1605, physical radio resources are allocated in the air interface, in which the physical radio resources are partitioned in segments comprising respective subcarriers and time slots, and in which the subcarriers use dimensions of bandwidth and the time slots use dimensions of time. At block 1610, CSI data is collected from the UE that represents conditions for data transmission over the air interface between the RU and UE. At block 1615, the collected CSI data is used to predict CSI that is applicable for subcarriers at future time slots that are available for handling the data transmissions. At block 1620, the predicted CSI is used to select subcarriers and time slots for data transmissions over the air interface between the RU and the UE for a slice of the 5G network, in which criteria for the selection comprise maximization of throughput for the slice over the air interface per bandwidth utilized, in which the throughput comprises data transmitted per unit time.

Figure 17:
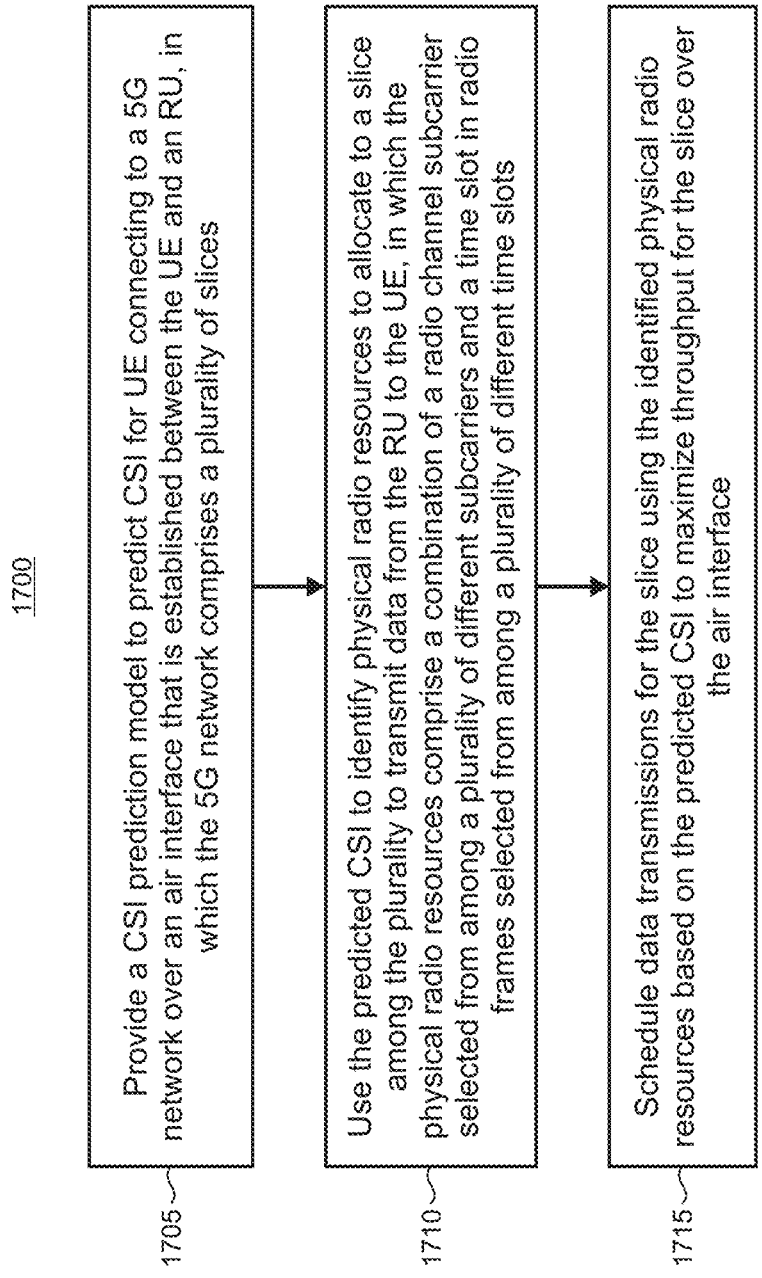

FIG. 17 is a flowchart of an illustrative method 1700 that may be performed in a 5G network. For example, the method 1700 may be performed by the slice controller 390 (FIG. 1) or by another suitable component or functionality disposed in the near-RT RIC 710 (FIG. 7). At block 1705, a CSI prediction model is provided to predict CSI for UE connecting to a 5G network over an air interface that is established between the UE and an RU, in which the 5G network comprises a plurality of slices. At block 1710, the predicted CSI is used to identify physical radio resources to allocate to a slice among the plurality to transmit data from the RU to the UE, in which the physical radio resources comprise a combination of a radio channel subcarrier selected from among a plurality of different subcarriers and a time slot in radio frames selected from among a plurality of different time slots. At block 1715, data transmissions are scheduled for the slice using the identified physical radio resources based on the predicted CSI to maximize throughput for the slice over the air interface.

Figure 18:
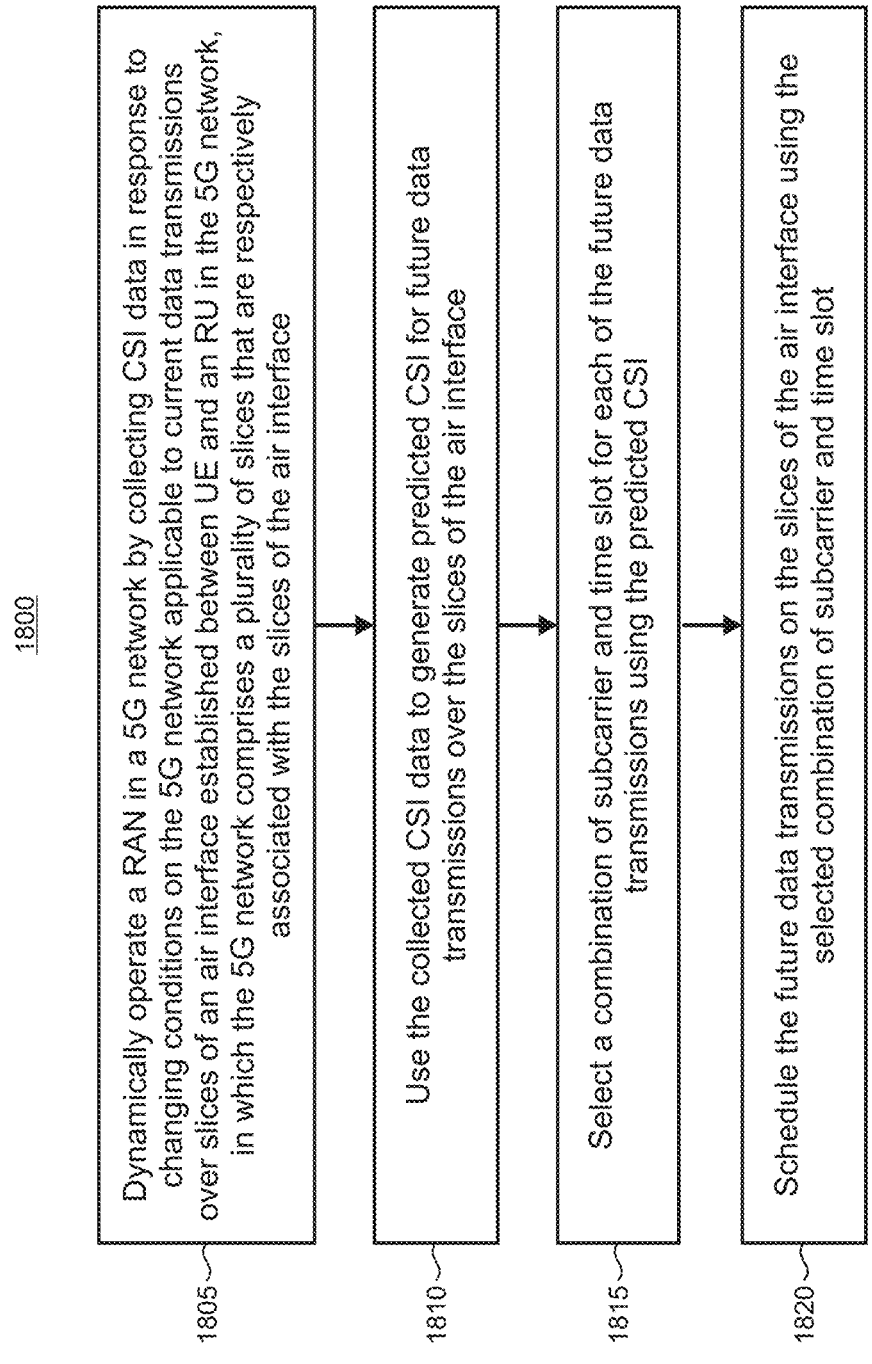

FIG. 18 is a flowchart of an illustrative method 1800 that may be performed in a 5G network. For example, the method 1800 may be performed by the slice controller 390 (FIG. 1) or by another suitable component or functionality disposed in the near-RT RIC 710 (FIG. 7). At block 1805, a RAN in a 5G network is dynamically operated by collecting CSI data in response to changing conditions on the 5G network applicable to current data transmissions over slices of an air interface established between UE and an RU in the 5G network, in which the 5G network comprises a plurality of slices that are respectively associated with the slices of the air interface. At block 1810, the collected CSI data is used to generate predicted CSI for future data transmissions over the slices of the air interface.

At block 1815, a combination of subcarrier and time slot is selected for each of the future data transmissions using the predicted CSI. At block 1820, the future data transmissions are scheduled on the slices of the air interface using the selected combination of subcarrier and time slot.

Figure 19:
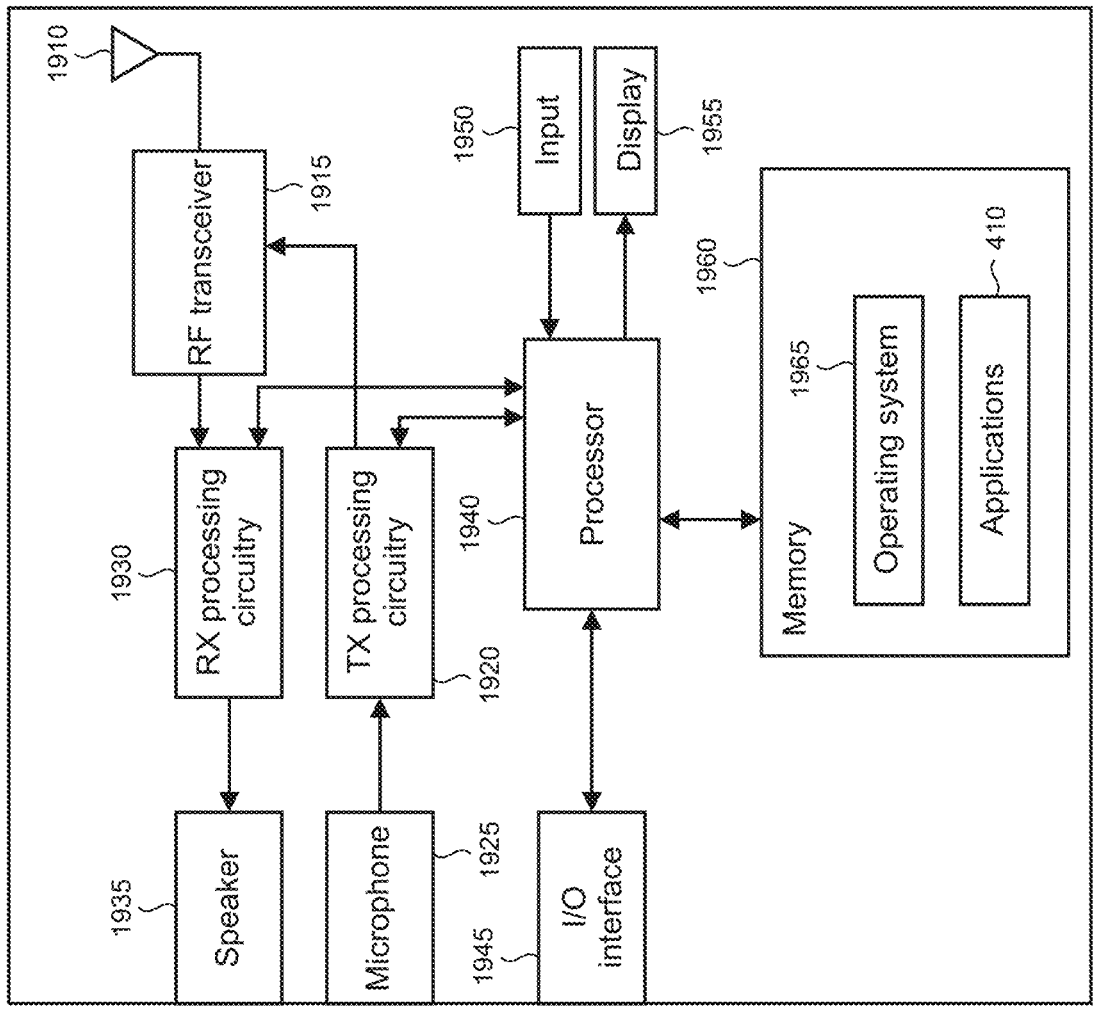
FIG. 19 is a block diagram of an illustrative UE that may be used at least in part to implement the present dynamic 5G network slicing to maximize spectrum utilization.

FIG. 19 is a block diagram of an illustrative UE 200 that may be used at least in part to implement the present dynamic 5G network slicing to maximize spectrum utilization. The embodiment of the UE 200 shown in FIG. 19 is for illustration only, and the UEs 200 shown in the drawings and described in the preceding text may have the same or similar configuration. However, it is noted that UEs may come in a wide variety of configurations, and FIG. 19 does not limit the scope of the present disclosure to any particular implementation of a UE.

The UE 200 includes an antenna 1910, a radio frequency (RF) transceiver 1915, transmit (TX) processing circuitry 1920, a microphone 1925, and receive (RX) processing circuitry 1930. The UE 200 also includes a speaker 1935, a processor 1940, an input/output (I/O) interface 1945, an input device 1950, a display 1955, and a memory 1960. The memory includes an operating system (OS) program 1965 and one or more applications 410.

The RF transceiver 1915 receives from the antenna 1910, an incoming RF signal transmitted by a gNB of a 5G network 400 (FIG. 4). The RF transceiver down-converts the incoming RF signal to generate an intermediate frequency (IF) or baseband signal. The IF or baseband signal is sent to the RX processing circuitry 1930, which generates a processed baseband signal by filtering, decoding, and/or digitizing the baseband or IF signal. The RX processing circuitry transmits the processed baseband signal to the speaker 1935 (such as for voice data) or to the processor 1940 for further processing (such as for web browsing data).

The TX processing circuitry 1920 receives analog or digital voice data from the microphone 1925 or other outgoing baseband data (such as web data, e-mail, or interactive video game data) from the processor 1940. The TX processing circuitry 1920 encodes, multiplexes, and/or digitizes the outgoing baseband data to generate a processed baseband or IF signal. The RF transceiver 1915 receives the outgoing processed baseband or IF signal from the TX processing circuitry and up-converts the baseband or IF signal to an RF signal that is transmitted via the antenna.

The processor 1940 can include one or more processors or other processing devices and execute the OS program 1965 stored in the memory 1960 to control the overall operation of the UE 200. For example, the processor may control the reception of forward channel signals and the transmission of reverse channel signals by the RF transceiver 1915, the RX processing circuitry 1930, and the TX processing circuitry 1920 in accordance with well-known principles. In some embodiments, the processor 1940 includes at least one microprocessor or microcontroller.

The processor 1940 may be configured for executing other processes and programs resident in the memory 1960, such as operations for CSI measurement and reporting for systems described in embodiments of the present disclosure. The processor can move data into or out of the memory as required by an executing process. In some embodiments, the processor may be configured to execute the applications 405 based on the OS program 1965 or in response to signals received from gNBs or an operator. The processor is also coupled to the I/O interface 1945, which provides the UE 200 with the ability to connect to other computing devices such as laptop computers and handheld computers. The I/O interface may thus function as a communication path between such accessories and the processor.

The processor 1940 is also coupled to the input device 1950 (e.g., keypad, touchscreen, buttons etc.) and the display 1955. A user of the UE 200 can typically employ the input device to enter data into the UE. For example, the display can be a liquid crystal display or other display capable of rendering text and/or graphics, video, etc., from web sites, applications and/or service providers.

The memory 1960 is coupled to the processor 1940. Part of the memory may include a random access memory (RAM), and another part of the memory may include a Flash memory or other read-only memory (ROM).

As described in more detail below, the UE 200 can perform signaling and calculation for CSI reporting. Although FIG. 19 shows one illustrative example of UE 200, it may be appreciated that various changes may be made to the drawing. For example, various components may be combined, further subdivided, or omitted and additional components may be added according to particular needs. As a particular example, the processor 1940 may be divided into multiple processors, such as one or more central processing units (CPUs) and one or more graphics processing units (GPUs). Also, while FIG. 19 depicts the UE 200 as configured as a mobile device, such as a smartphone, UEs may be configured to operate as other types of portable or stationary devices.

Figure 20:
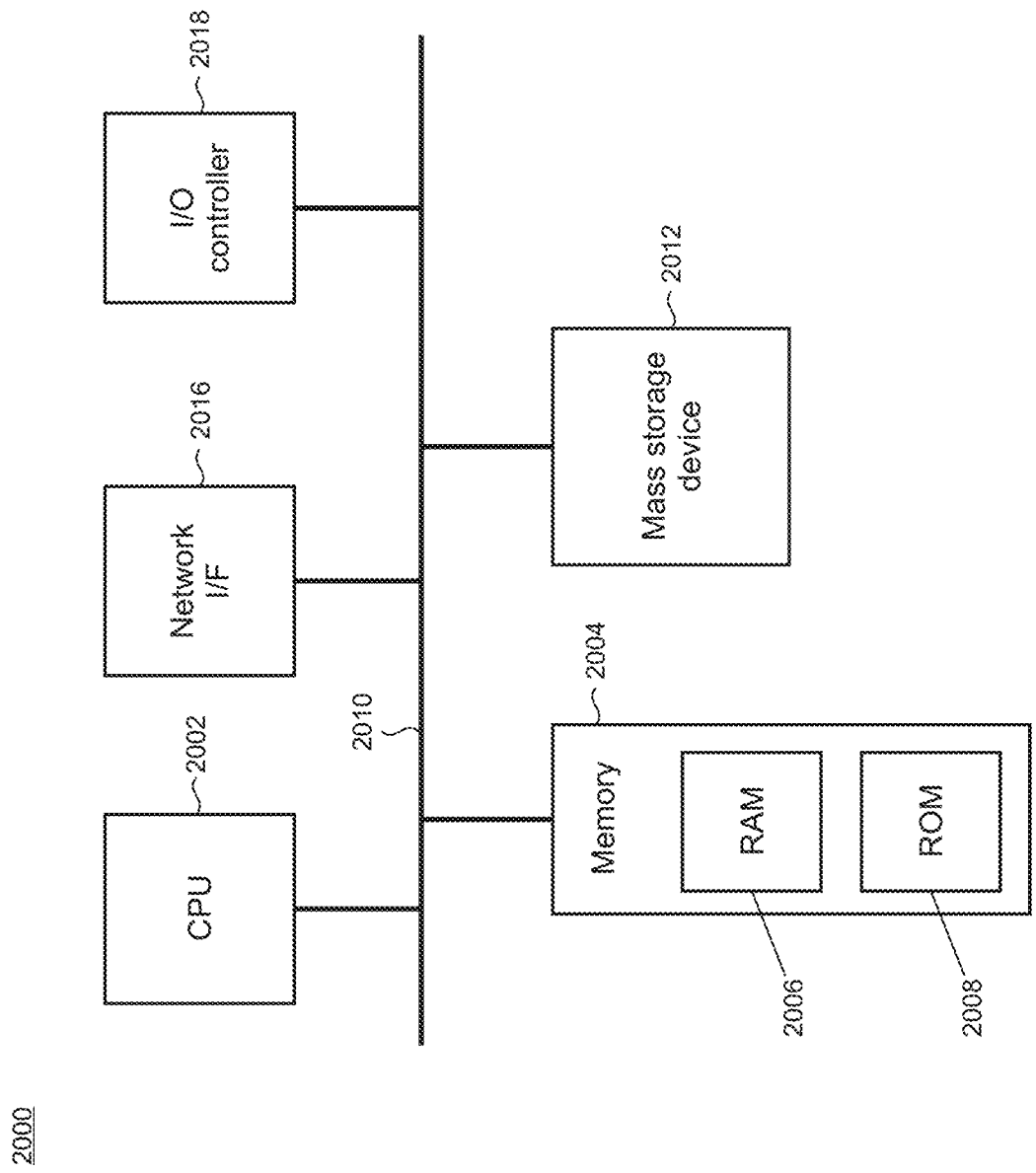
FIG. 20 is a block diagram of an illustrative server or computing device that may be used at least in part to implement the present dynamic 5G network slicing to maximize spectrum utilization.

FIG. 20 shows an illustrative architecture 2000 for a computing device, such as a server, capable of executing the various components described herein for 5G admission by verifying slice SLA guarantees. The architecture 2000 illustrated in FIG. 20 includes one or more processors 2002 (e.g., central processing unit, dedicated AI chip, graphics processing unit, etc.), a system memory 2004, including RAM (random access memory) 2006 and ROM (read only memory) 2008, and a system bus 2010 that operatively and functionally couples the components in the architecture 2000. A basic input/output system containing the basic routines that help to transfer information between elements within the architecture 2000, such as during startup, is typically stored in the ROM 2008. The architecture 2000 further includes a mass storage device 2012 for storing software code or other computer-executed code that is utilized to implement applications, the file system, and the operating system. The mass storage device 2012 is connected to the processor 2002 through a mass storage controller (not shown) connected to the bus 2010. The mass storage device 2012 and its associated computer-readable storage media provide non-volatile storage for the architecture 2000. Although the description of computer-readable storage media contained herein refers to a mass storage device, such as a hard disk or CD-ROM drive, it may be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It may be appreciated that the network interface unit 2016 also may be utilized to connect to other types of networks and remote computer systems. The architecture 2000 also may include an input/output controller 2018 for receiving and processing input from a number of other devices, including a keyboard, mouse, touchpad, touchscreen, control devices such as buttons and switches or electronic stylus (not shown in FIG. 20). Similarly, the input/output controller 2018 may provide output to a display screen, user interface, a printer, or other type of output device (also not shown in FIG. 20).

It may be appreciated that the software components described herein may, when loaded into the processor 2002 and executed, transform the processor 2002 and the overall architecture 2000 from a general-purpose computing system into a special-purpose computing system customized to facilitate the functionality presented herein. The processor 2002 may be constructed from any number of transistors or other discrete circuit elements, which may individually or collectively assume any number of states. More specifically, the processor 2002 may operate as a finite-state machine, in response to executable instructions contained within the software modules disclosed herein. These computer-executable instructions may transform the processor 2002 by specifying how the processor 2002 transitions between states, thereby transforming the transistors or other discrete hardware elements constituting the processor 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2000 in order to store and execute the software components presented herein. It also may be appreciated that the architecture 2000 may include other types of computing devices, including wearable devices, handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
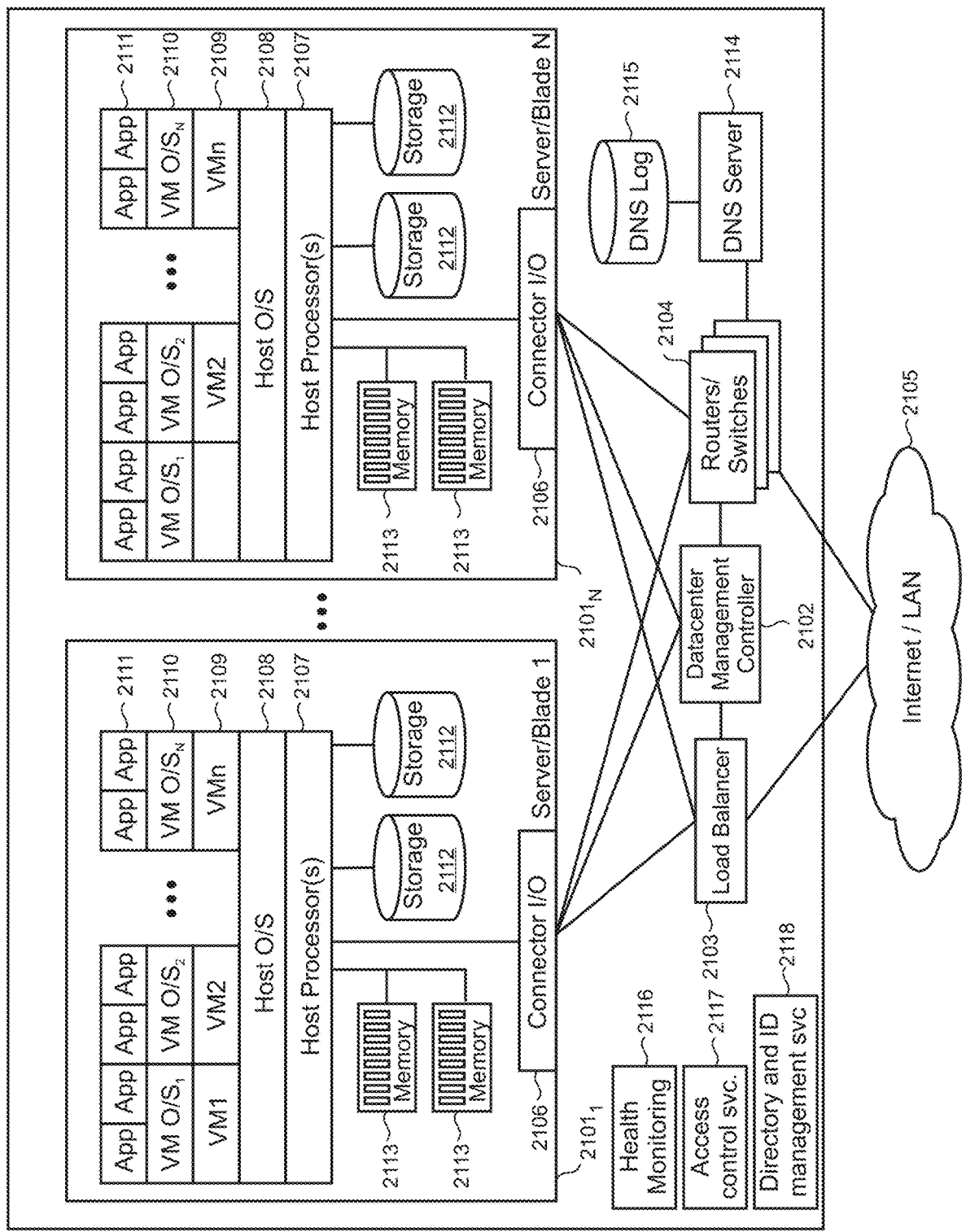
FIG. 21 is a block diagram of an illustrative datacenter that may be used at least in part to implement the present dynamic 5G network slicing to maximize spectrum utilization.

FIG. 21 is a high-level block diagram of an illustrative datacenter 2100 that provides cloud computing services or distributed computing services that may be used to implement the present dynamic 5G network slicing to maximize spectrum utilization. Datacenter 2100 may incorporate one or more of the features disclosed in the DCs shown in the drawings and disclosed in the accompanying text. A plurality of servers 2101 are managed by datacenter management controller 2102. Load balancer 2103 distributes requests and computing workloads over servers 2101 to avoid a situation wherein a single server may become overwhelmed. Load balancer 2103 maximizes available capacity and performance of the resources in datacenter 2100. Routers/switches 2104 support data traffic between servers 2101 and between datacenter 2100 and external resources and users (not shown) via an external network 2105, which may be, for example, a local area network (LAN) or the Internet.

Servers 2101 may be standalone computing devices, and/or they may be configured as individual blades in a rack of one or more server devices. Servers 2101 have an input/output (I/O) connector 2106 that manages communication with other database entities. One or more host processors 2107 on each server 2101 run a host operating system (O/S) 2108 that supports multiple virtual machines (VM) 2109. Each VM 2109 may run its own O/S so that each VM O/S 2110 on a server is different, or the same, or a mix of both. The VM O/Ss 2110 may be, for example, different versions of the same O/S (e.g., different VMs running different current and legacy versions of the Windows® operating system). In addition, or alternatively, the VM O/Ss 2110 may be provided by different manufacturers (e.g., some VMs running the Windows® operating system, while other VMs are running the Linux® operating system). Each VM 2109 may also run one or more applications (App) 2111. Each server 2101 also includes storage 2112 (e.g., hard disk drives (HDD)) and memory 2113 (e.g., RAM) that can be accessed and used by the host processors 2107 and VMs 2109 for storing software code, data, etc. In one embodiment, a VM 2109 may employ the data plane APIs as disclosed herein.

Datacenter 2100 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2100 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2109 on server $2101_1$ to run their applications 2111. When demand for an application 2111 increases, the datacenter 2100 may activate additional VMs 2109 on the same server $2101_1$ and/or on a new server $2101_N$ as needed. These additional VMs 2109 can be deactivated if demand for the application later drops.

Datacenter 2100 may offer guaranteed availability, disaster recovery, and back-up services. For example, the datacenter may designate one VM 2109 on server $2101_1$ as the primary location for the tenant's application and may activate a second VM 2109 on the same or a different server as a standby or back-up in case the first VM or server $2101_1$ fails. The datacenter management controller 2102 automatically shifts incoming user requests from the primary VM to the back-up VM without requiring tenant intervention. Although datacenter 2100 is illustrated as a single location, it will be understood that servers 2101 may be distributed to multiple locations across the globe to provide additional redundancy and disaster recovery capabilities. Additionally, datacenter 2100 may be an on-premises, private system that provides services to a single enterprise user or may be a publicly accessible, distributed system that provides services to multiple, unrelated customers and tenants or may be a combination of both.

Domain Name System (DNS) server 2114 resolves domain and host names into IP addresses for all roles, applications, and services in datacenter 2100. DNS log 2115 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2116 monitors the health of the physical systems, software, and environment in datacenter 2100. Health monitoring 2116 provides feedback to datacenter managers when problems are detected with servers, blades, processors, or applications in datacenter 2100 or when network bandwidth or communications issues arise.

Access control service 2117 determines whether users are allowed to access particular connections and services provided at the datacenter 2100. Directory and identity management service 2118 authenticates user credentials for tenants on datacenter 2100.

FIG. 22 is a simplified block diagram of an illustrative computer system 2200 such as a PC, client machine, or server with which the present dynamic 5G network slicing to maximize spectrum utilization may be implemented. Computer system 2200 includes a processor 2205, a system memory 2211, and a system bus 2214 that couples various system components including the system memory 2211 to the processor 2205. The system bus 2214 may be any of several types of bus structures including a memory bus or memory controller, a peripheral bus, or a local bus using any of a variety of bus architectures. The system memory 2211 includes read only memory (ROM) 2217 and random access memory (RAM) 2221. A basic input/output system (BIOS) 2225, containing the basic routines that help to transfer information between elements within the computer system 2200, such as during startup, is stored in ROM 2217. The computer system 2200 may further include a hard disk drive 2228 for reading from and writing to an internally disposed hard disk (not shown), a magnetic disk drive 2230 for reading from or writing to a removable magnetic disk 2233 (e.g., a floppy disk), and an optical disk drive 2238 for reading from or writing to a removable optical disk 2243 such as a CD (compact disc), DVD (digital versatile disc), or other optical media. The hard disk drive 2228, magnetic disk drive 2230, and optical disk drive 2238 are connected to the system bus 2214 by a hard disk drive interface 2246, a magnetic disk drive interface 2249, and an optical drive interface 2252, respectively. The drives and their associated computer-readable storage media provide non-volatile storage of computer-readable instructions, data structures, program modules, and other data for the computer system 2200. Although this illustrative example includes a hard disk, a removable magnetic disk 2233, and a removable optical disk 2243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present dynamic 5G network slicing to maximize spectrum utilization. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2233, optical disk 2243, ROM 2217, or RAM 2221, including an operating system 2255, one or more application programs 2257, other program modules 2260, and program data 2263. A user may enter commands and information into the computer system 2200 through input devices such as a keyboard 2266 and pointing device 2268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2205 through a serial port interface 2271 that is coupled to the system bus 2214, but may be connected by other interfaces, such as a parallel port, game port, or universal serial bus (USB). A monitor 2273 or other type of display device is also connected to the system bus 2214 via an interface, such as a video adapter 2275. In addition to the monitor 2273, personal computers typically include other peripheral output devices (not shown), such as speakers and printers. The illustrative example shown in FIG. 22 also includes a host adapter 2278, a Small Computer System Interface (SCSI) bus 2283, and an external storage device 2276 connected to the SCSI bus 2283.

The computer system 2200 is operable in a networked environment using logical connections to one or more remote computers, such as a remote computer 2288. The remote computer 2288 may be selected as another personal computer, a server, a router, a network PC, a peer device, or other common network node, and typically includes many or all of the elements described above relative to the computer system 2200, although only a single representative remote memory/storage device 2290 is shown in FIG. 22. The logical connections depicted in FIG. 22 include a local area network (LAN) 2293 and a wide area network (WAN) 2295. Such networking environments are often deployed, for example, in offices, enterprise-wide computer networks, intranets, and the Internet.

When used in a LAN networking environment, the computer system 2200 is connected to the local area network 2293 through a network interface or adapter 2296. When used in a WAN networking environment, the computer system 2200 typically includes a broadband modem 2298, network gateway, or other means for establishing communications over the wide area network 2295, such as the Internet. The broadband modem 2298, which may be internal or external, is connected to the system bus 2214 via a serial port interface 2271. In a networked environment, program modules related to the computer system 2200, or portions thereof, may be stored in the remote memory storage device 2290. It is noted that the network connections shown in FIG. 22 are illustrative and other means of establishing a communications link between the computers may be used depending on the specific requirements of an application of the present dynamic 5G network slicing to maximize spectrum utilization.

Various exemplary embodiments of the present dynamic 5G network slicing to maximize spectrum utilization are now presented by way of illustration and not as an exhaustive list of all embodiments. An example includes a computer-implemented method for scheduling data transmission on an air interface of a 5G (fifth generation) network, in which the air interface is established between a radio unit (RU) and a plurality of user equipment (UE), and in which the 5G network comprises a plurality of slices, the computer-implemented method comprising: allocating physical radio resources in the air interface, the physical radio resources being partitioned in segments comprising respective subcarriers and time slots, in which the subcarriers use dimensions of bandwidth and the time slots use dimensions of time; collecting channel state information (CSI) data from the UE that represents conditions for data transmission over the air interface between the RU and UE; using the collected CSI data to predict CSI that is applicable for subcarriers at future time slots that are available for handling the data transmissions; and using the predicted CSI to select subcarriers and time slots for data transmissions over the air interface between the RU and the UE for a slice of the 5G network, wherein criteria for the selection comprise maximization of throughput for the slice over the air interface per bandwidth utilized, in which the throughput comprises data transmitted per unit time.

In another example, the physical radio resources are partitioned into segments defined by one or more numerologies, each numerology being different and expressing at least one of subcarrier spacing, cyclic prefix type, OFDM (orthogonal frequency-division multiplexing) symbol count, radio frame structure, or time slot length. In another example, the computer-implemented method further includes scheduling data for transmission using the selected subcarriers and time slots. In another example, the computer-implemented method further includes transmitting data based on the scheduling. In another example, the subcarriers are selected from one or more different numerologies, each numerology describing at least one of subcarrier spacing, time slot length, or frame structure. In another example, the computer-implemented method is performed, at least in part, in a near-real-time radio access network intelligent controller (near-RT RIC) as described by the O-RAN Alliance. In another example, the computer-implemented method further includes performing the scheduling using a MAC (Medium Access Control) layer component disposed in a distributed unit (DU) of a 5G RAN (radio access network). In another example, the MAC layer in the DU interoperates with a PHY (physical) layer functionality disposed in the RU.

A further example includes one or more hardware-based non-transitory computer-readable memory devices storing computer-executable instructions which, upon execution by one or more processor disposed in a computing device, cause the computing device to: provide a channel state information (CSI) prediction model to predict CSI for user equipment (UE) connecting to a 5G (fifth generation) network over an air interface that is established between the UE and a radio unit (RU), in which the 5G network comprises a plurality of slices; use the predicted CSI to identify physical radio resources to allocate to a slice among the plurality to transmit data from the RU to the UE, in which the physical radio resources comprise a combination of a radio channel subcarrier selected from among a plurality of different subcarriers and a time slot in radio frames selected from among a plurality of different time slots; and schedule data transmissions for the slice using the identified physical radio resources based on the predicted CSI to maximize throughput for the slice over the air interface.

In another example, the plurality of subcarriers comprise radio spectrum bandwidth, and the data transmissions are further scheduled to maximize throughput per bandwidth that is utilized by the selected subcarriers. In another example, the CSI prediction model comprises a predictive propagation model. In another example, the predictive propagation model uses reinforcement learning that considers CSI data from one or more online or offline sources. In another example, the online sources of CSI data comprise CSI feedback from a population of UE that is engaged in current communications sessions on the 5G network over the air interface, the CSI feedback reporting dynamic channel conditions between the RU and the UE.

A further example includes a computing device, comprising: at least one processor; and at least one hardware-based non-transitory computer-readable storage device having computer-executable instructions stored thereon which, when executed by the least one processor, cause the computing device to dynamically operate a radio access network (RAN) in a 5G (fifth generation) network by collecting channel state information (CSI) data in response to changing conditions on the 5G network applicable to current data transmissions over slices of an air interface established between user equipment (UE) and a radio unit (RU) in the 5G network, in which the 5G network comprises a plurality of slices that are respectively associated with the slices of the air interface; use the collected CSI data to generate predicted CSI for future data transmissions over the slices of the air interface; select a combination of subcarrier and time slot for each of the future data transmissions using the predicted CSI; and schedule the future data transmissions on the slices of the air interface using the selected combination of subcarrier and time slot.

In another example, the computer-executable instructions, when executed by the least at one processor, further cause the computing device to maximize total throughput across the slices of the air interface. In another example, the computer-executable instructions, when executed by the at least one processor, further cause the computing device to maximize utilization of a radio spectrum, in which subcarriers are distributed in a frequency domain across the radio spectrum. In another example, the computer-executable instructions, when executed by the at least one processor, further cause the computing device to transmit or receive data transmissions based on the scheduled future data transmission over a respective air interface downlink or an air interface uplink. In another example, a time slot length in a time domain is inversely proportional to subcarrier spacing in a frequency domain. In another example, a near-real-time radio access network intelligent controller (near-RT RIC) interoperates with a MAC (Medium Access Control) layer component to control radio resource allocation among slices of the air interface, the radio resources being expressed by subcarrier and time slot. In another example, the radio resources are partitioned into segments being defined by a numerology, the numerology referring to values of physical transmission parameters defining the air interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A computer-implemented method for scheduling data transmission on an air interface of a 5G (fifth generation) network, in which the air interface is established between a radio unit (RU) and a plurality of user equipment (UE), and in which the 5G network comprises a plurality of slices, the computer-implemented method comprising:
   allocating physical radio resources in the air interface, the physical radio resources being partitioned in segments comprising respective subcarriers and time slots, in which the subcarriers use dimensions of bandwidth and the time slots use dimensions of time;
   collecting channel state information (CSI) data from the UE that represents conditions for data transmission over the air interface between the RU and UE;
   using the collected CSI data to predict CSI that is applicable for subcarriers at future time slots that are available for handling the data transmissions; and
   using the predicted CSI to select subcarriers and time slots for data transmissions over the air interface between the RU and the UE for a slice of the 5G network, wherein criteria for the selection comprise maximization of throughput for the slice over the air interface per bandwidth utilized, in which the throughput comprises data transmitted per unit time.

2. The computer-implemented method of claim 1 in which the physical radio resources are partitioned into segments defined by one or more numerologies, each numerology being different and expressing at least one of subcarrier spacing, cyclic prefix type, OFDM (orthogonal frequency-division multiplexing) symbol count, radio frame structure, or time slot length.

3. The computer-implemented method of claim 1 further including scheduling data for transmission using the selected subcarriers and time slots.

4. The computer-implemented method of claim 3 further including transmitting data based on the scheduling.

5. The computer-implemented method of claim 1 in which the subcarriers are selected from one or more different numerologies, each numerology describing at least one of subcarrier spacing, time slot length, or frame structure.

6. The computer-implemented method of claim 1 in which the computer-implemented method is performed, at least in part, in a near-real-time radio access network intelligent controller (near-RT RIC) as described by the O-RAN Alliance.

7. The computer-implemented method of claim 1 further including performing the scheduling using a MAC (Medium Access Control) layer component disposed in a distributed unit (DU) of a 5G RAN (radio access network).

8. The computer-implemented method of claim 7 in which the MAC layer in the DU interoperates with a PHY (physical) layer functionality disposed in the RU.

9. One or more hardware-based non-transitory computer-readable memory devices storing computer-executable instructions which, upon execution by one or more processor disposed in a computing device, cause the computing device to:
   provide a channel state information (CSI) prediction model to predict CSI for user equipment (UE) connecting to a 5G (fifth generation) network over an air interface that is established between the UE and a radio unit (RU), in which the 5G network comprises a plurality of slices;
   use the predicted CSI to identify physical radio resources to allocate to a slice among the plurality to transmit data from the RU to the UE, in which the physical radio resources comprise a combination of a radio channel subcarrier selected from among a plurality of different subcarriers and a time slot in radio frames selected from among a plurality of different time slots; and schedule data transmissions for the slice using the identified physical radio resources based on the predicted CSI to maximize throughput for the slice over the air interface.

10. The one or more hardware-based non-transitory computer-readable memory devices of claim 9 in which the plurality of subcarriers comprise radio spectrum bandwidth, and the data transmissions are further scheduled to maximize throughput per bandwidth that is utilized by the selected subcarriers.

11. The one or more hardware-based non-transitory computer-readable memory devices of claim 9 in which the CSI prediction model comprises a predictive propagation model.

12. The one or more hardware-based non-transitory computer-readable memory devices of claim 11 in which the predictive propagation model uses reinforcement learning that considers CSI data from one or more online or offline sources.

13. The one or more hardware-based non-transitory computer-readable memory devices of claim 12 in which the online sources of CSI data comprise CSI feedback from a population of UE that is engaged in current communications sessions on the 5G network over the air interface, the CSI feedback reporting dynamic channel conditions between the RU and the UE.

14. A computing device, comprising:
at least one processor; and
at least one hardware-based non-transitory computer-readable storage device having computer-executable instructions stored thereon which, when executed by the least one processor, cause the computing device to dynamically operate a radio access network (RAN) in a 5G (fifth generation) network by collecting channel state information (CSI) data in response to changing conditions on the 5G network applicable to current data transmissions over slices of an air interface established between user equipment (UE) and a radio unit (RU) in the 5G network, in which the 5G network comprises a plurality of slices that are respectively associated with the slices of the air interface;

use the collected CSI data to generate predicted CSI for future data transmissions over the slices of the air interface;

select a combination of subcarrier and time slot for each of the future data transmissions using the predicted CSI; and schedule the future data transmissions on the slices of the air interface using the selected combination of subcarrier and time slot.

15. The computing device of claim 14 in which the computer-executable instructions, when executed by the least at one processor, further cause the computing device to maximize total throughput across the slices of the air interface.

16. The computing device of claim 14 in which the computer-executable instructions, when executed by the at least one processor, further cause the computing device to maximize utilization of a radio spectrum, in which subcarriers are distributed in a frequency domain across the radio spectrum.

17. The computing device of claim 14 in which the computer-executable instructions, when executed by the at least one processor, further cause the computing device to transmit or receive data transmissions based on the scheduled future data transmission over a respective air interface downlink or an air interface uplink.

18. The computing device of claim 14 in which a time slot length in a time domain is inversely proportional to subcarrier spacing in a frequency domain.

19. The computing device of claim 14 in which a near-real-time radio access network intelligent controller (near-RT RIC) interoperates with a MAC (Medium Access Control) layer component to control radio resource allocation among slices of the air interface, the radio resources being expressed by subcarrier and time slot.

20. The computing device of claim 19 in which the radio resources are partitioned into segments being defined by a numerology, the numerology referring to values of physical transmission parameters defining the air interface.

* * * * *